United States Patent
Abdallah et al.

(10) Patent No.: US 12,328,208 B2
(45) Date of Patent: Jun. 10, 2025

(54) MACHINE LEARNING BASED CHANNEL ESTIMATION METHOD FOR FREQUENCY-SELECTIVE MIMO SYSTEM

(71) Applicant: KING ABDULLAH UNIVERSITY OF SCIENCE AND TECHNOLOGY, Thuwal (SA)

(72) Inventors: Asmaa Abdallah, Thuwal (SA); Abdulkadir Çelik, Thuwal (SA); Ahmed Eltawil, Irvine, CA (US); Mohammad Mansour, Beirut (LB)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/168,876

(22) Filed: Feb. 14, 2023

(65) Prior Publication Data
US 2023/0300006 A1 Sep. 21, 2023

Related U.S. Application Data

(60) Provisional application No. 63/311,247, filed on Feb. 17, 2022.

(51) Int. Cl.
*H04L 25/02* (2006.01)
*H04B 7/0413* (2017.01)

(52) U.S. Cl.
CPC ....... *H04L 25/0242* (2013.01); *H04B 7/0413* (2013.01); *H04L 25/0254* (2013.01)

(58) Field of Classification Search
CPC .......... H04B 1/38; H04B 1/40; H04B 7/0413; H04B 7/0456; H04B 7/0626;
(Continued)

(56) References Cited

U.S. PATENT DOCUMENTS

| | | | | |
|---|---|---|---|---|
| 2012/0201320 | A1* | 8/2012 | Koike-Akino | ...... H04L 25/0246 375/267 |
| 2014/0098704 | A1* | 4/2014 | Wang | .................. H04L 25/0212 370/254 |

(Continued)

OTHER PUBLICATIONS

Alkhateeb, A., et al., "Deep Learning Coordinated Beamforming for Highly-Mobile Millimeter Wave Systems," IEEE Access, Jul. 25, 2018 (published Jun. 25, 2018), vol. 6, pp. 37 328-37 348.
(Continued)

*Primary Examiner* — Young T. Tse
(74) *Attorney, Agent, or Firm* — PATENT PORTFOLIO BUILDERS PLLC

(57) ABSTRACT

A machine learning based method for channel estimation for a multiple-input multiple-output, MIMO, system, the method including receiving a measured signal y[k] at a receiver of the system; finding subcarriers k of the measured signal y[k]; estimating, with a convolutional neural network, CNN, channel amplitudes $\hat{g}[k]$ of the measured signal y[k]; reconstructing a channel $\hat{H}[k]$, between the receiver and a transmitter of the system, based on the channel amplitudes $\hat{g}[k]$ and a low resolution whiten measurement matrix $\Upsilon_w$; and adjusting a parameter of the system based on the reconstructed channel $\hat{H}[k]$. The channel amplitudes $\hat{g}[k]$ are simultaneously estimated by the CNN.

20 Claims, 24 Drawing Sheets

(58) Field of Classification Search
CPC . H04B 7/0632; H04L 25/0202; H04L 25/024; H04L 25/0242; H04L 25/0254; H04L 25/03178; H04L 25/03184; H04L 25/03197
USPC ........ 375/219, 259, 260, 267; 370/328, 329, 370/334, 434, 435; 455/39, 500, 503, 455/509
See application file for complete search history.

(56) References Cited

U.S. PATENT DOCUMENTS

| | | | |
|---|---|---|---|
| 2019/0222406 A1* | 7/2019 | Wang | H04L 25/0224 |
| 2022/0140850 A1* | 5/2022 | Luo | H04B 1/525 |
| | | | 455/298 |

OTHER PUBLICATIONS

Baveli, E., et al., "Massive Mimo Channel Estimation with an Untrained Deep Neural Network," IEEE Transations on Wireless Communications, Mar. 2020 (published Jan. 3, 2020), vol. 19, No. 3, pp. 2079-2090, arXiv:1908.00144v1 [eess.SP] Jul. 31, 2019.

Chun, C.-J., et al., "Deep Learning-Based Channel Estimation for Massive MIMO Systems," IEEE Wireless Communications Letters, Aug. 2019, vol. 8, No. 4, pp. 1228-1231.

Demire, Ö.T., et al., "Channel Estimation in Massive MIMO Under Hardware Non-Linearities: Bayesian Methods Versus Deep Learning," IEEE Open Journal of the Communications Society, Jan. 16, 2020 (publication Dec. 16, 2019), vol. 1, pp. 109-124.

Dong, P., et al., "Deep CNN-Based Channel Estimation for mmWave Massive MIMO Systems," IEEE Journal of Selected Topics in Signal Processing. Jul. 1, 2019, vol. 13, No. 5, pp. 989-1000, arXiv:1904.06761v2 [cs.IT] Apr. 23, 2021.

Dörner, S., et al., "Deep Learning-Based Communication Over the Air," IEEE Journal of Selected Topics Signal Processing, Dec. 15, 2017, vol. 12, No. 1, pp. 132-143, arXiv:1707.03384v1 [stat.ML] Jul. 11, 2017.

Elbir, A.M., "CNN-based Precoder and Combiner Design in mmWave MIMO Systems," IEEE Communication Letters, May 9, 2019, vol. 23, No. 7, pp. 1240-1243.

Elbir, A.M., et al., "Joint Antenna Selection and Hybrid Beamformer Design using Unquantized and Quantized Deep Learning Networks," IEEE Transaction Wireless on Communications, Dec. 5, 2019, vol. 19, No. 3, pp. 1677-1688, arXiv:1905.03107v2 [eess.SP] Nov. 23, 2019.

Elbir, A.M., et al., "Online and Offline Deep Learning Strategies for Channel Estimation and Hybrid Beamforming in Multi-Carrier mm-Wave Massive MIMO Systems," Digital Communications and Networks, Jul. 20, 2022, pp. 1-15, arXiv:1912.10036v3 [eess.SP] Jun. 29, 2020.

He, H., et al., "Deep Learning-Based Channel Estimation for Beamspace mmWave Massive MIMO Systems," IEEE Wireless Communications Letters, Oct. 2018, vol. 7, No. 5, pp. 852-855.

Hodge, J.A., et al., "Multi-Discriminator Distributed Generative Model for Multi-Layer RF Metasurface Discovery," 2019 IEEE Global Conference on Signal and Information Processing (GlobalSIP), Ottawa, ON, Canada, Nov. 11-14, 2019, pp. 1-5.

Huang, H., et al., "Deep-Learning-based Millimeter-Wave Massive MIMO for Hybrid Precoding," IEEE Transactions Vehicular Technology, Mar. 2019 (published Jan. 18, 2019), vol. 68, No. 3, pp. 3027-3032, arXiv:1901.06537v1 [jeess.SP] Jan. 19, 2019.

Jin, Y., et al., "Channel Estimation for Cell-Free mmWave Massive MIMO Through Deep Learning," IEEE Transactions on Vehicular Technology, Oct. 2019, vol. 68, No. 10, pp. 10325-10329.

Long, Y., et al., "Data-driven Based Analog Beam Selection for Hybrid Beamforming under Mm-Wave Channels," IEEE Journal of Selected Topics in Signal Processing, Mar. 22, 2018, vol. 12, No. 2, pp. 340-352.

Ma, W., et al., "Sparse Channel Estimation and Hybrid Precoding Using Deep Learning for Millimeter Wave Massive MIMO," IEEE Transactions on Communications, May 2020 (published Feb. 17, 2020), vol. 68, No. 5, pp. 2838-2849.

Rodríguez-Fernández, J., et al., "Frequency-domain Compressive Channel Estimation for Frequency-selective Hybrid mmWave MIMO Systems," IEEE Transactions on Wireless Communications, May 2018 (published Mar. 2, 2018), vol. 17, No. 5, pp. 2946-2960; arXiv:1704.08572v1 [cs.IT] Apr. 27, 2017.

Soltani, M., et al., "Deep Learning-Based Channel Estimation," IEEE Communications Letters, Apr. 2019 (published Feb. 12, 2019), vol. 23, No. 4, pp. 652-655, arXiv:1810.05893v2 [cs.IT] Jan. 16, 2019.

Wei, X., et al., "Deep Learning for Beamspace Channel Estimation in Millimeter-Wave Massive MIMO Systems," IEEE Transactions on Communications, Jan. 2021 (published Sep. 28, 2020), vol. 69, No. 1, pp. 182-193, arXiv:1910.12455v3 [eess.SP] Oct. 23, 2020.

Ye, H., et al., "Power of Deep Learning for Channel Estimation and Signal Detection in OFDM Systems," IEEE Wireless Communications Letters, Feb. 2018 (published Sep. 28, 2017), vol. 7, No. 1, pp. 114-117.

Zhang, K., et al., "Beyond a Gaussian Denoiser: Residual Learning of Deep CNN for Image Denoising," IEEE Transactions on Image Processing, Jul. 2017 (published Feb. 1, 2017), vol. 26, No. 7, pp. 3142-3155, arXiv:1608.03981v1 [cs.CV] Aug. 13, 2016.

* cited by examiner

Table I: NOTATION

| Notation | Definition |
|---|---|
| $\mathbf{F}_{RF} \in \mathbb{C}^{N_t \times L_t}$ | RF analog precoder (time domain (TD)) |
| $\mathbf{W}_{RF} \in \mathbb{C}^{N_r \times L_r}$ | RF analog combiner (TD) |
| $\mathbf{F}_{BB}[k] \in \mathbb{C}^{L_t \times N_s}$ | Baseband digital precoder (frequency domain(FD)) |
| $\mathbf{W}_{BB}[k] \in \mathbb{C}^{L_r \times N_s}$ | Baseband digital combiner (FD) |
| $\mathbf{s}[k] \in \mathbb{C}^{N_s \times 1}$ | Data symbol vector (FD) |
| $\mathbf{H}_d \in \mathbb{C}^{N_r \times N_t}$ | $d^{th}$ delay tap of the channel (TD) |
| $\Delta_d \in \mathbb{C}^{L \times L}$ | Complex diagonal matrix (time domain) |
| $\mathbf{A}_R \in \mathbb{C}^{N_r \times L}$ | Receive array steering matrix |
| $\mathbf{A}_T \in \mathbb{C}^{N_t \times L}$ | Transmit array steering matrix |
| $\mathbf{H}[k] \in \mathbb{C}^{N_r \times N_t}$ | Channel at $k^{th}$ subcarrier (FD) |
| $\Delta[k] \in \mathbb{C}^{L \times L}$ | Complex diagonal matrix (FD) |
| $\tilde{\mathbf{A}}_R \in \mathbb{C}^{N_r \times G_r}$ | Dictionary Matrix for receive array response |
| $\tilde{\mathbf{A}}_T \in \mathbb{C}^{N_t \times G_t}$ | Dict. matrix for transmit array response |
| $\tilde{\mathbf{A}}_R^r \in \mathbb{C}^{N_t \times G_r^r}$ | Refining dict. matrix for receive array response |
| $\tilde{\mathbf{A}}_T^r \in \mathbb{C}^{N_t \times G_t^r}$ | Refining dict. matrix for transmit array response |
| $\Delta_d^v \in \mathbb{C}^{G_r \times G_t}$ | Path gains sparse matrix of the virtual channel (TD) |
| $\Delta^v[k] \in \mathbb{C}^{G_r \times G_t}$ | Path gains sparse matrix of the virtual channel (FD) |
| $\Phi \in \mathbb{C}^{M L_r \times N_t N_r}$ | Measurement matrix |
| $\Psi \in \mathbb{C}^{N_t N_r \times G_t G_r}$ | Dictionary matrix |
| $\mathbf{h}^v[k] \in \mathbb{C}^{G_r G_t \times 1}$ | Sparse vector containing complex channel gains (FD) |
| $\Upsilon \in \mathbb{C}^{M L_r \times G_t G_r}$ | Equivalent measurement matrix |
| $\mathbf{y}[k] \in \mathbb{C}^{M L_r \times 1}$ | Received signal (FD) |

FIG. 1A

| | A |
|---|---|
| $\mathbf{c}[k] \in \mathbb{C}^{G_r G_t}$ | Correlation vector (FD) |
| $\mathbf{C}_W \in \mathbb{C}^{ML_r \times ML_r}$ | Noise covariance matrix of $\mathbf{y}[k]$ |
| $\mathbf{D}_W \in \mathbb{C}^{ML_r \times ML_r}$ | Whitening matrix (upper triangular matrix) |
| $\mathbf{y}_W[k] \in \mathbb{C}^{ML_r \times 1}$ | Whitened received signal (FD) |
| $\Upsilon_W \in \mathbb{C}^{ML_r \times G_t G_r}$ | Whitened measurement matrix |
| $\Upsilon_W^d \in \mathbb{C}^{ML_r \times G_t G_r^r}$ | White. meas. matrix to remove detection uncertainly |
| $\Upsilon_W^r \in \mathbb{C}^{ML_r \times G_t G_r}$ | White. meas. matrix for refining |
| $\mathbf{C}_\alpha[k] \in \mathbb{R}^{G_r \times G_t}$ | Input matrix to the DnCNN (FD) |
| $\mathbf{G}[k] \in \mathbb{R}^{G_r \times G_t}$ | Output matrix of the DnCNN (FD) |
| $\mathbf{g}[k] \in \mathbb{R}^{G_r G_t \times 1}$ | Vectorized form of $\mathbf{G}[k]$ (FD) |
| $\xi[k] \in \mathbb{C}^{L \times 1}$ | Vector of actual channel gains (FD) |
| $\mathbf{P} \in \mathbb{C}^{ML_r \times ML_r}$ | Projection matrix |
| $\mathbf{r}[k] \in \mathbb{C}^{ML_r \times 1}$ | Residual vector (FD) |
| $\mathcal{T}$ | Sparse channel support set |
| $\mathcal{K}$ | Subset from total $K$ subcarriers |

FIG. 1B

Algorithm 1 DL-CS-CE

Input: $y[k]$, $\Phi$, $\Psi$, $\tilde{A}_T$, $\tilde{A}_R$, $K_p$, $\in$

1: $y_w[k] \leftarrow D_w^{-*} y[k] \; \forall k$

2: $r[k] \leftarrow y_w[k] \; \forall k$

3: $\hat{\mathcal{T}}, \mathcal{K} \leftarrow \{\emptyset\}$

4: $\Upsilon_w \leftarrow D_w^{-*} \Phi \Psi$

5: $\mathcal{K} \leftarrow$ FIND STRONGEST SUBCARRIERS ($y[k]$)

6: $\hat{g}[k] \leftarrow$ ESTIMATE AMPLITUDES ($\Upsilon_w^*$, $r[k], \mathcal{K}$)

7: $\hat{H}[k] \leftarrow$ RECONSTRUCT CHANNEL ($\hat{g}[k]$)

return $\hat{H}[k]$

8: procedure FIND STRONGEST SUBCARRIERS($y[k]$)

9: for $i = 1 : K_p$ do

$$\mathcal{K} = \mathcal{K} \cup \underset{k \notin \mathcal{K}}{\arg\max} \|y[k]\|_2^2$$

10: end for return $\mathcal{K}$

11: end procedure

12: procedure ESTIMATE AMPLITUDES($\Upsilon_w^*$, $r[k], \mathcal{K}$)

13: $c[k] \leftarrow \Upsilon_w^* r[k], k \in \mathcal{K}$ // as per (21)

14: $C_a[k] \leftarrow$ vec2mat ($|c[k]|, [G_r, G_t]$) // as per (22)

15: $\hat{G}[k] \xleftarrow[\text{DnCNN}]{\text{online}} C_a[k]$ // [c.f. Fig. 6]

16: $\hat{g}[k] \leftarrow$ vec($\hat{G}[k]$) // as per (25)

return $\hat{g}[k], \forall k \in \mathcal{K}$

17: end procedure

18: procedure RECONSTRUCT CHANNEL($\hat{g}[k], \forall k$)

FIG. 7A

19: MSE ← ∞

20: $i \leftarrow 1$

21: $\mathcal{I} \leftarrow$ INDEXSORTDESCEND ($\Sigma_{k \in \mathcal{K}} |\hat{g}[k]|$)

22: while MSE > ∈ & $i \leq G_t G_r$ do

23: $\hat{\mathcal{T}} \leftarrow \hat{\mathcal{I}} \cup (i)$

24: $\hat{\tilde{\xi}}[k] \leftarrow ([\Upsilon_w]_{:,\hat{\mathcal{T}}})^\dagger \, y_w[k], \forall k$ 25: $r[k] \leftarrow y_w[k] - [\Upsilon_w]_{:,\hat{\mathcal{T}}} \, \hat{\tilde{\xi}}[k], \forall k$ 26: MSE $\leftarrow \frac{1}{KML_r} \Sigma_{k=0}^{K-1} r^*[k]r[k]$ 27: $i \leftarrow i + 1$ 28: end while

29: $\hat{L} \leftarrow i$ // Estimate # paths

30: $\hat{h}^v[k] \leftarrow$ as per (29)

31: $\text{vec}\{\hat{\Delta}^v[k]\} \leftarrow \hat{h}^v[k]$

32: $\text{vec}\{\hat{H}[k]\} \leftarrow (\bar{\tilde{A}}_T \otimes \tilde{A}_R) \, \text{vec}\{\hat{\Delta}^v[k]\}$.

return $\hat{H}[k]$

33: end procedure

FIG. 7B

Table II: AVERAGE SIZE OF ESTIMATED SUPPORT $\hat{L} = |\hat{\mathcal{T}}|$

| SNR | -15 dB | -10 dB | -5 dB | -0 dB | 5 dB |
|---|---|---|---|---|---|
| $\hat{L}$ | 4 | 5 | 9 | 12 | 15 |

FIG. 8

Algorithm 2 Refined DL-CS-CE

Input: $y[k]$, $\Phi$, $\Psi$, $\tilde{A}_T$, $\tilde{A}_R$, $\tilde{A}_T^r$, $\tilde{A}_R^r$, $K_p$, $\epsilon$
1: $y_w[k] \leftarrow D_{\bar{w}}^* y[k] \; \forall k$
2: $r[k] \leftarrow y_w[k] \; \forall k$
3: $\hat{\mathcal{T}}, \mathcal{K} \leftarrow \{\emptyset\}$
4: $\Phi_w = D_{\bar{w}}^* \Phi$
5: $\Psi \leftarrow (\tilde{\bar{A}}_T \otimes \tilde{A}_R)$ // *For Detection*
6: $\Upsilon_w \leftarrow D_{\bar{w}}^* \Phi \Psi$
7: $\Psi^r = (\tilde{\bar{A}}_T^r \otimes \tilde{A}_R^r)$ // *For Refining*
8: $\Upsilon_w^r \leftarrow D_{\bar{w}}^* \Phi \Psi^r$
9: $\mathcal{K} \leftarrow$ FIND STRONGEST SUBCARRIERS ($y[k]$)
10: $\hat{g}[k] \leftarrow$ ESTIMATE AMPLITUDES ($\Upsilon_w^*$, $r[k], \mathcal{K}$)
11: $\hat{H}[k] \leftarrow$ RECONSTRUCT CHANNEL & REFINE($\hat{g}[k]$)
return $\hat{H}[k]$ 12: procedure FIND STRONGEST SUBCARRIERS($y[k]$)
13:     Lines 9-10 in Algorithm 1
14: end procedure

15: procedure ESTIMATE AMPLITUDES($\Upsilon_w^*$, $r[k], \mathcal{K}$)
16:     Lines 13-16 in Algorithm 1
17: end procedure

18: procedure RECONSTRUCT CHANNEL & REFINE($\hat{g}[k]$)
19:     $\mathcal{I} \leftarrow$ INDEXSORTDESCEND ($\Sigma_{k \in \mathcal{K}} |\hat{g}[k]|$)
20:     MSE $\leftarrow \infty$
21:     $i \leftarrow 1$
22:     while MSE $> \epsilon$ & $i \leq G_t G_r$ do
23:         $[i_{AoA}^d, i_{AoD}^d] \leftarrow$ ind2sub($[G_r, G_t], \mathcal{I}(i)$)
24:         $\hat{\mathcal{T}} \leftarrow$ REFINE ($i_{AoA}^d, i_{AoD}^d$)
25:         $\hat{\tilde{\xi}}[k] \leftarrow ([\Upsilon_w^r]_{:,\hat{\mathcal{T}}}) \; y_w[k], \forall k$
26:         $r[k] \leftarrow y_w[k] - [\Upsilon_w^r]_{:,\hat{\mathcal{T}}} \hat{\tilde{\xi}}[k], \forall k$
27:         MSE $\leftarrow \frac{1}{KML_r} \Sigma_{k=0}^{K-1} r^*[k] r[k]$
28:         $i \leftarrow i+1$
29:     end while
30:     $\hat{L} \leftarrow i$ // Estimate # paths
31:     $\hat{h}^v[k] \leftarrow$ as per (29) but using $[\Upsilon_w^r]_{:,\hat{\mathcal{T}}}$ instead

FIG. 9A

32: $\text{vec}\{\hat{\Delta}^v[k]\} \leftarrow \hat{\mathbf{h}}^v[k]$
33: $\text{vec}\{\hat{\mathbf{H}}[k]\} \leftarrow \Psi^r \text{vec}\{\hat{\Delta}^v[k]\}$.
   return $\hat{\mathbf{H}}[k]$
34: end procedure

35: procedure REFINE($i^d_{AoA}, i^d_{AoD}$)
36:  $i^r_{AoA} \leftarrow$ as per in (31)
37:  $i^r_{AoD} \leftarrow$ as per in (32)
38:  $i^r_{AoA}{}^* \leftarrow$ as per in (34)
39:  $i^r_{AoD}{}^* \leftarrow$ as per in (32) by using $i^r_{AoA}{}^*$ instead of $i^r_{AoA}$
40:  $j^* \leftarrow$ sub2ind ($[G^r_r, G^r_t], [(i^r_{AoA}{}^*, i^r_{AoD}{}^*)]$)
41:  $\hat{\mathcal{T}} \leftarrow \hat{\mathcal{T}} \cup j^*$
   return $\hat{\mathcal{T}}$
41: end procedure

FIG. 9B

Table III: SIMULATION PARAMETERS

| Parameter | Value |
|---|---|
| Total size of dataset | 10,000 |
| Total number of subcarriers ($K$) | 16 |
| Subset number of subcarriers ($K_p$) | $K/4$ |
| Operating frequency | 60 GHz |
| Number of TX (RX) antennas $N_t$ ($N_r$) | 16(64) |
| Number of TX (RX) RF chains $L_t$ ($L_r$) | 2(4) |
| Grid size of TX (RX) detecting dictionary steering vectors $G_t$ ($G_r$) | $2N_t$ ($2N_r$) |
| Grid size of TX (RX) refining dictionary steering vectors $G_t^r$ ($G_r^r$) | $8N_t$ ($8N_r$) |
| Channel paths $L$ | 16 |
| Number of delay taps of the channel $N_c$ | 16 |
| Distribution of AoAs/AoDs | $u(0,\pi)$ |

FIG. 10

Table IV: AVERAGE RUNNING TIME FOR $M = 100$ AND SNR $= -5$ dB

| Algorithm | Run time [seconds] |
|---|---|
| DL-CS-CE $G_r = 2N_r$ and $G_t = 2N_t$ | 0.144 |
| Refined DL-CS-CE $G_r^r = 2N_r$ and $G_t^r = 2N_t$ | 0.201 |
| Refined DL-CS-CE $G_r^r = 8N_r$ and $G_t^r = 8N_t$ | 0.464 |
| SW-OMP for grids $G_r = 2N_r$ and $G_t = 2N_t$ | 0.25 |
| SW-OMP for grids $G_r = 8N_r$ and $G_t = 8N_t$ | 0.97 |

FIG. 16

MACHINE LEARNING BASED CHANNEL ESTIMATION METHOD FOR FREQUENCY-SELECTIVE MIMO SYSTEM

CROSS-REFERENCE TO RELATED APPLICATIONS

This application claims priority to U.S. Provisional Patent Application No. 63/311,247, filed on Feb. 17, 2022, entitled "CHANNEL ESTIMATION FOR FREQUENCY SELECTIVE mmWAVE MIMO SYSTEMS," the disclosure of which is incorporated herein by reference in its entirety.

BACKGROUND OF THE INVENTION

Technical Field

Embodiments of the subject matter disclosed herein generally relate to a system and method for channel estimation in a communication system, and more particularly, to using machine learning for frequency-selective channel estimation of multiple-input multiple-output (MIMO) system.

Discussion of the Background

In the continuous quest to be more integrated and internet connected so that all devices are able to communicate with each other, it is the goal of the telecommunication community to deliver higher connection speed, ultra-low latency, more reliability, massive network capacity, increased availability, and a more uniform experience to the users. Millimeter wave (mmWave) communication has emerged as a key technology to fulfill this goal, i.e., the beyond fifth-generation (B5G) network requirements. The mmWave band offers an abundant frequency spectrum (30-300 GHz) at the cost of low penetration depth and high propagation losses. Fortunately, its short-wavelength mitigates these drawbacks by allowing the deployment of large antenna arrays into small form factor transceivers, paving the way for multiple-input multiple-output (MIMO) systems with high directivity gains.

In order to achieve the above noted goals, there is a need to accurately provide channel estimation. Channel estimation refers to a procedure of determining/learning all possible paths (channels) between the transmitter and the receiver as some of the channels are more impacted than others by the ambient medium, i.e., buildings, moving vehicles, trees, etc., and thus, these channels needs to have their parameters adjusted. In addition, the channel estimation is required to happen continuously as the transmitter, receiver or both may change their spatial positions during the data exchange. The most appropriate structure for implementing the above noted goals is the hybrid MIMO system. The hybrid MIMO configuration has been introduced to operate at mmWave frequencies because an all-digital architecture, with a dedicated radio frequency (RF) chain for each antenna element, results in an expensive system architecture and high-power consumption at these frequencies. In these hybrid architectures, phase-only analog beamformers are employed to steer the beams using steering vectors of quantized angles. The down-converted signal is then processed by low-dimensional baseband beamformers, each of which is dedicated to a single RF chain. The number of RF chains is significantly reduced with this combination of (1) high-dimensional phase-only analog and (2) low-dimensional baseband digital beamformers.

Moreover, an optimal configuration of the digital/analog precoders and combiners requires instantaneous channel state information (CSI) to achieve spatial diversity and multiplexing gain. However, acquiring mmWave CSI is challenging with a hybrid architecture due to the following reasons: 1) there is no direct access to the different antenna elements in the array since the channel is seen through the analog combining network, which forms a compression stage for the received signal when the number of RF chains is much smaller than the number of antennas, 2) the large channel bandwidth yields high noise power and low received signal-to-noise-ratio (SNR) before beamforming, and 3) the large size of channel matrices increases the complexity and overheads associated with traditional pre-coding and channel estimation algorithms. Therefore, a low complexity channel estimation for mmWave MIMO systems with hybrid architecture is necessary.

Channel estimation techniques typically leverage the sparse nature of mmWave MIMO channels by formulating the estimation as a sparse recovery problem and apply compressive sensing (CS) methods to solve it. Compressive sensing is a general framework for estimation of sparse vectors from linear measurements, see, for example, M. F. Duarte and Y. C. Eldar, "Structured compressed sensing: From theory to applications," IEEE Trans. Signal Process., vol. 59, no. 9, pp. 4053-4085, September 2011. The estimated supports of the sparse vectors using CS help identify the indices of Angle-of-Arrival (AoA) and Angle-of-Departure (AoD) pairs for each path in the mmWave channel, while the amplitudes of the nonzero coefficients in the sparse vectors represent the channel gains for each path. Therefore, these supports and amplitudes are the components to be estimated to obtain accurate CSI. Moreover, it has been shown that pilot training overhead can be reduced with compressive estimation, unlike the conventional approaches such as those based on least squares (LS) estimation.

Several channel estimation methods based on CS tools that explore the mmWave channel sparsity have been investigated in the literature. In one application, a distributed grid matching pursuit (DGMP) channel estimation scheme detects and iteratively updates the dominant entries of the line-of-sight (LoS) channel path. In another application, an orthogonal matching pursuit (OMP) channel estimation scheme is used for detecting multiple channel paths support entries. Likewise, a simultaneous weighted orthogonal matching pursuit (SW-OMP) channel estimation scheme based on a weighted OMP method is developed in yet another application for frequency selective mmWave systems. A sparse reconstruction problem was formulated in one application to estimate the channel independently for every subcarrier by exploiting common sparsity in the frequency domain. However, such optimization and CS-based channel estimation schemes detect the support indices of the mmWave channel sequentially and greedily, and hence are not globally optimal, which is one disadvantage of the existing systems.

Alternatively, deep learning (DL) approaches and data driven algorithms have recently received much attention as key enablers for beyond 5G networks. Traditionally, signal processing and numerical optimization techniques have been heavily used to address channel estimation at mmWave bands. However, optimization algorithms often demand considerable computational complexity overhead, which creates a barrier between theoretical design/analysis and real time processing requirements. Hence, the prior data-set observations and deep neural network (DNN) models can be leveraged to learn the non-trivial mapping from compressed received pilots to channels. DNNs can be used to approximate the optimization problems by selecting the suitable set of parameters that minimize the approximation error. The use of DNNs is expected to substantially reduce computational complexity and processing overhead since it only requires several layers of simple operations such as matrix-vector multiplications. Moreover, several successful DL applications have been demonstrated in wireless communications problems such as channel estimation [1]-[10], analog beam selection [11], [12], and hybrid beamforming [11], [13]-[17]. Besides, DL-based techniques, when compared with other conventional optimization methods, have been shown [2], [15], [16], [18] to be more computationally efficient in searching for beamformers and more tolerant to imperfect channel inputs. In [3], a learned denoising-based approximate message passing (LDAMP) network is presented to estimate the mmWave communication system with lens antenna array, where the noise term is detected and removed to estimate the channel.

Prior work on channel estimation for hybrid mmWave MIMO architecture [3]-[10], [13]-[15] consider the narrowband flat fading channel model for tractability, while the practical mmWave channels exhibit the wideband frequency-selective fading due to the very large bandwidth, short coherence time and different delays of multipath. MmWave environments such as indoor and vehicular communications are highly variable with short coherence time, which requires channel estimation algorithms that are robust to the rapidly changing channel characteristics.

Thus, there is a need for a new method and system for channel estimation in a hybrid, mmWave MIMO system that overcomes the above noted problems.

SUMMARY OF THE INVENTION

According to an embodiment, there is a machine learning based method for channel estimation for a multiple-input multiple-output, MIMO, system, the method including receiving a measured signal y[k] at a receiver of the system, finding subcarriers k of the measured signal y[k], estimating, with a convolutional neural network, CNN, channel amplitudes ĝ[k] of the measured signal y[k], reconstructing a channel Ĥ[k], between the receiver and a transmitter of the system, based on the channel amplitudes ĝ[k] and a low resolution whiten measurement matrix $\Upsilon_w$, and adjusting a parameter of the system based on the reconstructed channel Ĥ[k][k]. The channel amplitudes ĝ[k] are simultaneously estimated by the CNN.

According to another embodiment, there is a transceiver performing a machine learning channel estimation for a multiple-input multiple-output, MIMO, system, the transceiver including an interface configured to receive a measured signal y[k] at a receiver of the system and a processor connected to the interface and configured to, find subcarriers k of the measured signal y[k], estimate, with a convolutional neural network, CNN, channel amplitudes ĝ[k] of the measured signal y[k], reconstruct a channel Ĥ[k][k], between the receiver and a transmitter of the system, based on the channel amplitudes ĝ[k] and a low resolution whiten measurement matrix $\Upsilon_w$, and adjust a parameter of the system based on the reconstructed channel Ĥ[k][k]. The channel amplitudes ĝ[k] are simultaneously estimated by the CNN.

According to still another embodiment, there is a refined machine learning based method for channel estimation for a multiple-input multiple-output, MIMO, system, the method including receiving a measured signal y[k] at a receiver of the system, finding subcarriers k of the measured signal y[k], estimating, with a convolutional neural network, CNN, channel amplitudes ĝ[k] of the measured signal y[k], reconstructing and refining a channel Ĥ[k][k] between the receiver and a transmitter of the system based on the channel amplitudes ĝ[k] and a high resolution whiten measurement matrix $\Upsilon_w^r$, and adjusting a parameter of the system based on the reconstructed channel Ĥ[k][k]. The channel amplitudes ĝ[k] are simultaneously estimated by the CNN.

According to yet another embodiment, there is a transceiver performing a machine learning channel estimation for a multiple-input multiple-output, MIMO, system, the transceiver including an interface configured to receive a measured signal y[k] at a receiver of the system and a processor connected to the interface and configured to, find subcarriers k of the measured signal y[k], estimate, with a convolutional neural network, CNN, channel amplitudes ĝ[k] of the measured signal y[k], reconstruct and refine a channel Ĥ[k][k] between the receiver and a transmitter of the system based on the channel amplitudes ĝ[k] and a high resolution whiten measurement matrix, $\Upsilon_w^r$, and adjust a parameter of the system based on the reconstructed channel Ĥ[k][k]. The channel amplitudes ĝ[k] are simultaneously estimated by the CNN.

BRIEF DESCRIPTION OF THE DRAWINGS

For a more complete understanding of the present invention, reference is now made to the following descriptions taken in conjunction with the accompanying drawings, in which:

FIGS. 1A and 1B schematically illustrate the various notations used to describe a telecommunication system;

FIGS. 7A and 7B illustrate a program code for a deep learning and compressive-sensing based channel estimation (DL-CS-CE) method and FIG. 7C is a flowchart of the same method;

FIG. 8 is a table illustrating the average size of estimated support;

FIGS. 9A and 9B are a program code illustration for the refined DL-CS-CE method and FIG. 9C is a flowchart of the same method;

FIG. 10 illustrates the simulation parameters used to compare the above methods with traditional methods;

FIG. 16 illustrates the average run time for various algorithms under the same conditions.

DETAILED DESCRIPTION OF THE INVENTION

Figure 2:
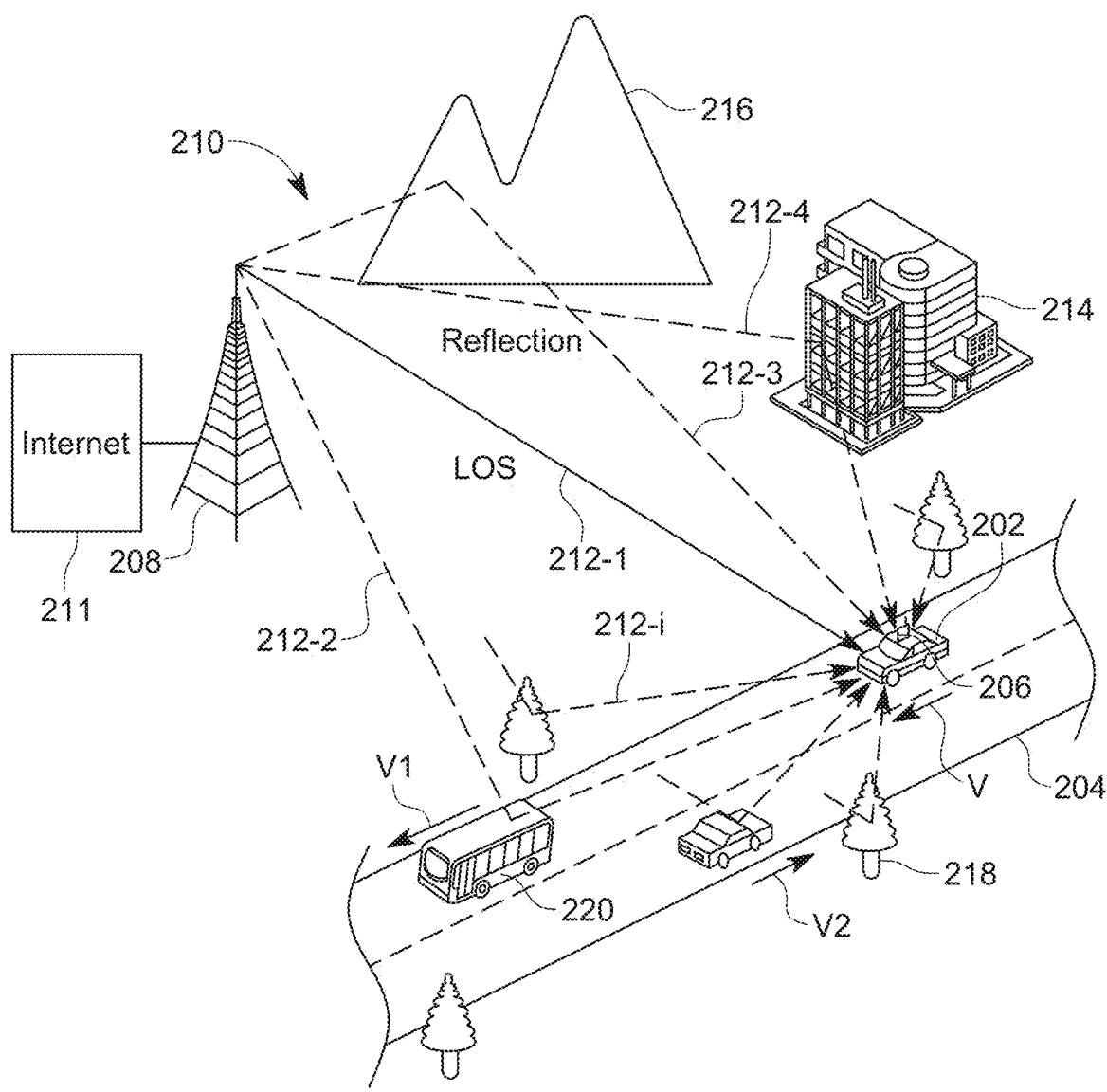
FIG. 2 schematically illustrates a telecommunication system having a user terminal and a base station and the various channels established between them.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a frequency-selective wideband mmWave system that uses DL compressing sensing based algorithm for channel estimation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

According to an embodiment, a frequency-selective wideband mmWave MIMO system is configured to use one of two novel machine learning (ML), for example, deep learning (DL), compressive sensing (CS) based algorithms for channel estimation. The proposed algorithms learn critical apriori information from training data to provide highly accurate channel estimates with low training overhead. In the first approach, a DL-CS based algorithm simultaneously estimates the channel supports in the frequency domain, which are then used for channel reconstruction. The second approach exploits the estimated supports to apply a low-complexity, multi-resolution, fine-tuning method to further enhance the estimation performance. Simulation results discussed later demonstrate that the proposed DL-based schemes significantly outperform conventional orthogonal matching pursuit (OMP) techniques in terms of the normalized mean-squared error (NMSE), computational complexity, and spectral efficiency, particularly in the low signal-to-noise ratio regime. When compared to OMP approaches that achieve an NMSE gap of 4 to 10 dB with respect to the Cramer Rao Lower Bound (CRLB), the proposed algorithms reduce the CRLB gap to only 1 to 1.5 dB, while significantly reducing the complexity by two orders of magnitude.

As the two algorithms are mathematically laborious, the notations used for describing them are first introduced. Bold upper case, bold lower case, and lower-case letters correspond to matrices, vectors, and scalars, respectively. Scalar norms, vector $L_2$ norms, and Frobenius norms, are denoted by $|\cdot|$, $\|\cdot\|_2$, and $\|\cdot\|_F$, respectively. The symbol X is used to denote a set. $I_X$ denotes a X×X identity matrix. $\mathbb{E}[\cdot](\cdot)^T$, $(\cdot)$, and $(\cdot)^*$ stand for expected value, transpose, complex conjugate, and Hermitian. $X^\dagger$ stands for the Moore-Penrose pseudo-inverse of X. $[x]_i$ represents $i^{th}$ element of a vector x. The $(i,j)^{th}$ entry of a matrix X is denoted by $[X]_{i,j}$. In addition, $[X]_{:,j}$ and $[X]_{:,\Omega}$ denote the $j^{th}$ column vector of matrix X and the sub-matrix consisting of the columns of matrix X with indices in the set $\Omega$. The {a}mod b means a modulo b. $\mathcal{C}\mathcal{N}(\mu, C)$ refers to a circularly-symmetric complex Gaussian distribution with mean $\mu$ and covariance matrix C. The operations vec(X), vec2mat(x, sz), sub2ind (sz, [r, c]), and ind2sub(sz, i) correspond to transforming a matrix into a vector, transforming a vector into a matrix for a defined size (sz), transforming the row r and column c subscripts of a matrix into their corresponding linear index, and transforming the linear index i into its corresponding row and column subscripts for a matrix of a defined size (sz), respectively. X⊗Y is the Kronecker product of X and Y. The most used model-related notation is listed in Table I in FIGS. 1A and 1B.

The system model for the frequency selective mmwave MIMO system is described next, followed by the novel two machine (e.g., deep) learning-based compressive sensing channel estimation schemes in the frequency domain. Note that the embodiments discussed herein can apply to any MIMO system, not only a mmWave MIMO system. A complexity analysis in terms of convergence and computational analysis are then presented followed by case studies with numerical results.

Figure 3:
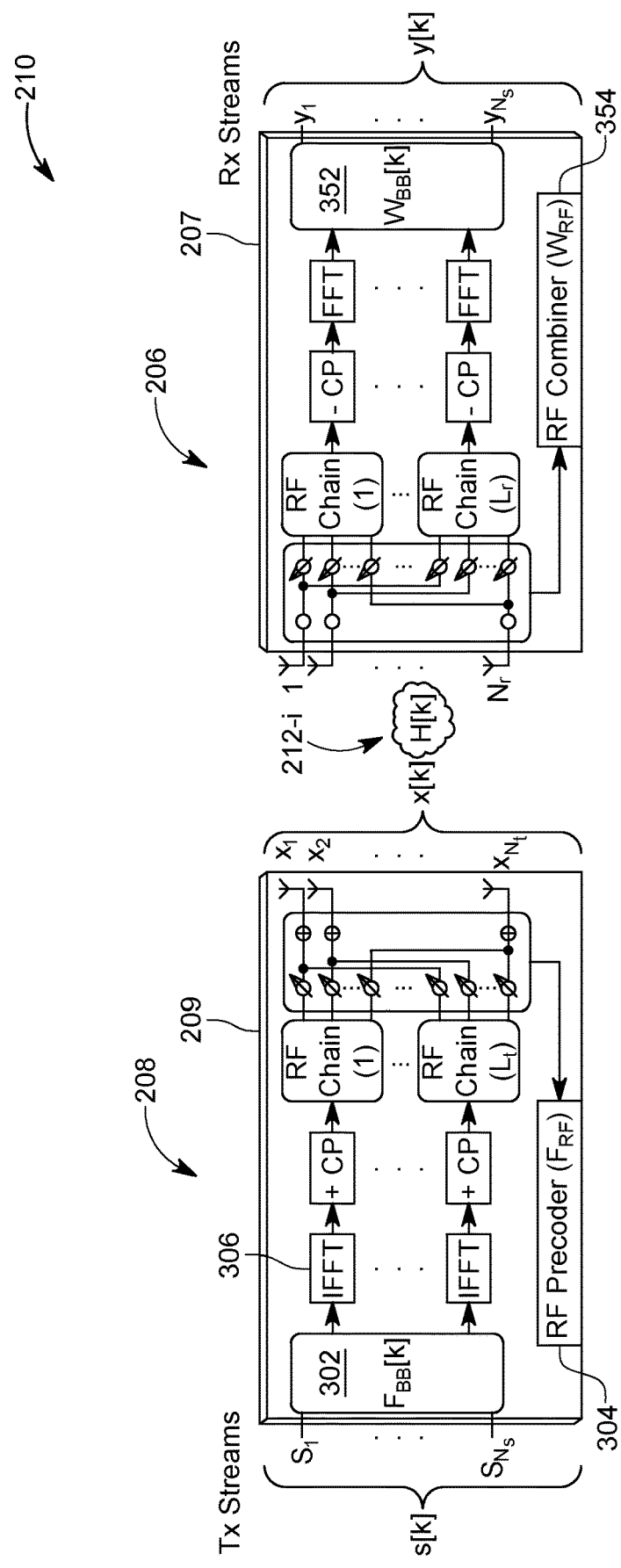
FIG. 3 illustrates a hybrid architecture system model of a mmWave MIMO system, which includes analog/digital precoders and combiners.

The system and channel models of frequency-selective hybrid mmWave transceivers are schematically illustrated in FIG. 2 and a more mathematical description of the system and models is illustrated in FIG. 3. FIG. 2 shows a user travelling in a car 202 along a road 204. The user has a user terminal UE 206 that communicates with a base station 208 of a communication system 210, for example, a telephone communication system that uses one or more of 1G to 5G communication protocols. The base station 208 is connected to internet 211. Plural channels 212-$i$ (with "i" being larger than 2) are established between the base station and the UE, as illustrated in the figure. Some of these channels correspond to a line of sight (LOS) path 212-1 while other 212-2 correspond to reflected paths. The reflected paths may reflect from buildings 214, geographical entities 216, biological entities 218, or moving vehicles 220. All these elements combined with their movement and/or the movement of the UE make the channels 212-*i* to evolve in time, which makes the channel estimation almost a continuous process. Note that the channel estimation is used by the UE and/or the base station to determine the amount of power used for each frequency, or, for the base station, to determine how much of the bandwidth/power to allocate to each user.

FIG. 3 illustrates the same system, but the internal configuration of the UE and the base station and the plural channels are mathematically described. As shown in this figure, an OFDM-based mmWave MIMO link employing a total of K subcarriers is used to send $N_s$ data streams from a transmitter 209 of the base station 208, with $N_t$ antennas, to a receiver 207 of the UE 206, with $N_r$ antennas. The system 210 is based on a hybrid MIMO architecture, with $L_t < N_t$ and $L_r < N_r$ radio frequency (RF) chains at the transmitter and receiver sides. A frequency-selective hybrid precoder is defined as $F[k]=F_{RF}F_{BB}[k] \in \mathbb{C}^{N_t \times N_s}$, $k=0, \ldots, K-1$, where $F_{RF}$ and $F_{BB}[k]$ are the analog precoder 302 and digital precoder 304, respectively. Although, the analog precoder 302 is considered to be frequency-flat, the digital precoder 304 is different for every subcarrier. The RF precoder 302/304 and the combiner 352/354 in the receiver 206 are deployed using a fully connected network of quantized phase shifters. During transmission, the transmitter (TX) first precodes data symbols $s[k] \in \mathbb{C}^{N_s \times 1}$ at each subcarrier by applying the subcarrier-dependent baseband precoder $F_{BB}[k]$ 302. The symbol blocks are then transformed into the time domain using $L_t$ parallel K-point inverse Fast Fourier transform (IFFT) 306. After adding the cyclic prefix (CP), the transmitter employs the subcarrier-independent RF precoder $F_{RF}$ 304 to form the transmitted signal x[k]. The complex baseband signal at the $k^{th}$ subcarrier can be expressed as $x[k]=F_{RF}F_{BB}[k]s[k]$, where s[k] denotes the transmitted symbol sequence at the $k^{th}$ subcarrier of size $N_s \times 1$.

The channel model is now discussed. A frequency-selective MIMO channel 212-*i* is considered between the transmitter 209 and the receiver 207. Note that each of the base station 208 and the UE 206 includes a transmitter 209 and a receiver 207 (and thus, each of the UE and the base station includes a transceiver 206/208), but FIG. 3 shows for simplicity the base station having the transmitter and the UE having the receiver. The channel is considered to have a delay tap length of $N_c$ in the time domain. The $d^{th}$ delay tap of the channel is denoted by an $N_r \times N_t$ matrix $H_d$, $d=0, 1, \ldots, N_c-1$. Assuming a geometric channel model, $H_d$ can be written as $$H_d = \sqrt{\frac{N_t N_r}{L \rho_L}} \sum_{\ell=1}^{L} \alpha_\ell p_{rc}(dT_s - \tau_\ell) a_R(\phi_\ell) a_T^*(\theta_\ell), \quad (1)$$

where $\rho_L$ represents the path loss between the transmitter and the receiver; L corresponds to the number of paths; $T_S$ denotes the sampling period; $p_{rc}(\tau)$ is a filter that includes the effects of pulse-shaping and other lowpass filtering evaluated at T; $\alpha_\ell \in \mathbb{C}$ is the complex gain of the $l^{th}$ path; $\tau_\ell \in \mathbb{R}$ is the delay of the $l^{th}$ path; $\phi_\ell \in [0,2\pi]$ and $\theta_\ell \in [0,2\pi]$ are the AoA and AoD of the $l^{th}$ path, respectively; and $a_R(\phi_\ell) \in \mathbb{C}^{N_r \times 1}$ and $a_T(\theta_\ell) \in \mathbb{C}^{N_t \times 1}$ are the array steering vectors for the receive and transmit antennas, respectively. Both the transmitter and the receiver are assumed to use Uniform Linear Arrays (ULAs) with half-wavelength separation such that the $n^{th}$ and the $m^{th}$ elements of these array steering vectors are given by:

$$[a_T(\theta_\ell)]_n = \sqrt{\frac{1}{N_t}} e^{jn\pi\cos(\theta_\ell)}, \quad n = 0, \ldots, N_t - 1,$$

$$[a_R(\phi_\ell)]_m = \sqrt{\frac{1}{N_r}} e^{jm\pi\cos(\phi_\ell)}, \quad m = 0, \ldots, N_r - 1.$$

The channel can be expressed more compactly in the following form:

$$H_d = A_R \Delta_d A_T^*, \quad (3)$$

where $\Delta_d \in \mathbb{C}^{L \times L}$ is diagonal with non-zero complex diagonal entries, and $A_R \in \mathbb{C}^{N_r \times L}$ and $A_T \in \mathbb{C}^{N_t \times L}$ contain the receive and transmit array steering vectors $a_R(\phi_l)$ and $a_T(\theta_l)$, respectively. The channel at subcarrier k can be written in terms of the different delay taps as:

$$H[k] = \sum_{d=0}^{N_c-1} H_d e^{-j\frac{2\pi k}{K}d} = A_R \Delta[k] A_T^*, \quad (4)$$

where $\Delta[k] \in \mathbb{C}^{L \times L}$ is diagonal with non-zero complex diagonal entries such that $$\Delta[k] = \sum_{d=0}^{N_c-1} \Delta_d e^{-j\frac{2\pi k}{N}d}, k = 0, \ldots, K - 1.$$

The Extended Virtual Channel Model is next discussed. It is further possible to approximate the channel $H_d$ using the extended virtual channel model as $$H_d \approx \tilde{A}_R \Delta_d^v \tilde{A}_T^*, \quad (5)$$

where $\Delta_d^v \in \mathbb{C}^{G_r \times G_t}$ corresponds to a sparse matrix that contains the path gains in the non-zero elements. Moreover, the dictionary matrices $\tilde{A}_T$ and $\tilde{A}_R$ contain the transmitter and receiver array response vectors evaluated on a grid of size $G_r \gg L$ for the AoA and a grid of size $G_t \gg L$ for the AoD, i.e., $$\tilde{\theta}_\ell \in \left\{ 0, \frac{2\pi}{G_r}, \ldots, \frac{2\pi(G_r - 1)}{G_r} \right\}$$

and $$\tilde{\phi}_\ell \in \left\{ 0, \frac{2\pi}{G_t}, \ldots, \frac{2\pi(G_t - 1)}{G_t} \right\},$$

respectively, and then:

$$\tilde{A}_T = [a_T(\tilde{\theta}_1) \ldots a_T(\tilde{\theta}_{G_t})], \quad (6)$$

$$\tilde{A}_R = [a_R(\tilde{\phi}_1) \ldots a_R(\tilde{\phi}_{G_r})]. \quad (7)$$

Because there are only a few scattering clusters in mmWave channels, the sparse assumption for $\Delta_d^v \in \mathbb{C}^{G_r \times G_t}$ is commonly accepted. To help expose the sparse structure, it is possible to express the channel at subcarrier k in terms of the sparse matrices $\Delta_d^v$ and the dictionaries $\tilde{A}_T$ and $\tilde{A}_R$ as follows:

$$H[k] \approx \tilde{A}_R \left( \sum_{d=0}^{N_c-1} \Delta_d^v e^{-j\frac{2\pi k}{K}d} \right) \tilde{A}_T^* \approx \tilde{A}_R \Delta^v[k] \tilde{A}_T^*, \qquad (8)$$

where $$\Delta[k] = \sum_{d=0}^{N_c-1} \Delta_d^v e^{-j\frac{2\pi k}{N}d}, k = 0, \ldots, K-1,$$

is a $G_r \times G_t$ complex sparse matrix containing the channel gains of the virtual channel.

The Signal Reception is now introduced. Considering that the receiver (RX) applies a hybrid combiner $W[k]=W_{RF}W_{BB}[k] \in \mathbb{C}^{N_r \times N_s}$, the received signal at subcarrier k can be expressed as:

$$y[k]=W_{BB}*[k]W_{RF}*H[k]F_{RF}F_{BB}[k]s[k]+W_{BB}[k]W_{RF}*n[k], \qquad (9)$$

where $n[k] \sim \mathcal{CN}(0,\sigma^2 I)$ corresponds to the circularly symmetric complex Gaussian distributed additive noise vector. The received signal model in equation (9) corresponds to the data transmission phase. As explained later, during the channel acquisition phase, frequency-flat training precoders and combiners will be considered to reduce its complexity.

During the training phase, the transmitter 209 and the receiver 207 use a training precoder $F_{tr}^{(m)} \in \mathbb{C}^{N_t \times L_t}$ and a training combiner $W_{tr}^{(m)} \in \mathbb{C}^{N_r \times L_r}$ for the $m^{th}$ pilot training frame, respectively. The precoders and combiners considered in this phase are frequency-flat to keep the complexity of the sparse recovery algorithms low. The transmitted symbols are assumed to satisfy the expression $$\mathbb{E}\{s^{(m)}[k]s^{(m)*}[k]\} = \frac{P}{N_s}I_{N_s},$$

where P is the total transmitted power and $N_s = L_t$. The transmitted symbol $s^{(m)}[k]$ is decomposed as $s^{(m)}[k]=q^{(m)}t^{(m)}[k]$, with $q^{(m)} \in \mathbb{C}^{L_t \times 1}$ being a frequency-flat vector and $t^{(m)}[k]$ a pilot symbol known at the receiver. This decomposition is used to reduce the computational complexity because it allows simultaneous use of the $L_t$ spatial degrees of freedom coming from the $L_t$ RF chains and enables channel estimation using a single subcarrier independent measurement matrix. Moreover, each entry in $F_{tr}^{(m)}$ and in $W_{tr}^{(m)}$ are normalized such that their squared modulus would be $1/N_t$ and $1/N_r$, respectively. Then, the received samples in the frequency domain for the $m^{th}$ training frame can be expressed as:

$$y^{(m)}[k]=W_{tr}^{(m)*}H[k]F_{tr}^{(m)}q^{(m)}t^{(m)}[k]+n_c^{(m)}[k], \qquad (10)$$

where $H[k][k] \in \mathbb{C}^{N_r \times N_t}$ denotes the frequency-domain MIMO channel response at the $k^{th}$ subcarrier and $n_c^{(m)}[k] \in \mathbb{C}^{L_r \times 1}$, $n_c^{(m)}[k]=W_{tr}^{(m)*}n^{(m)}[k]$, represent the frequency-domain combined noise vector received at the $k^{th}$ subcarrier. The average received SNR is given by $$SNR = \frac{P}{\rho_L \sigma^2}.$$

Furthermore, the channel coherence time is assumed to be larger than the frame duration and that the same channel can be considered for several consecutive frames.

The Measurement Matrix is now discussed. In order to apply sparse reconstruction with a single subcarrier-independent measurement matrix, first the effect of the scalar $t^{(m)}[k]$ is removed by multiplying the received signal by $t^{(m)}[k]^{-1}$. Using the following property vec $\{AXC\}=(C^T \otimes A)$vec$\{X\}$, the vectorized received signal is given by:

$$vec\{y^{(m)}[k]\}=(q^{(m)T}F_{tr}^{(m)T} \otimes W_{tr}^{(m)*})vec\{H[k]\}+n_c^{(m)}[k]. \qquad (11)$$

The vectorized channel matrix can be expressed as $$vec\{H[k]\}=(\bar{\tilde{A}}_T \otimes \tilde{A}_R)vec\{\Delta^v[k]\}. \qquad (12)$$

Furthermore, the measurement matrix $\Phi^{(m)} \in \mathbb{C}^{L_r \times N_t N_r}$ can be defined as:

$$\Phi^{(m)}=(q^{(m)T}F_{tr}^{(m)T} \otimes W_{tr}^{(m)*}), \qquad (13)$$

and the dictionary $\Psi \in \mathbb{C}^{N_t N_r \times G_t G_r}$ as $$\Phi=(\bar{\tilde{A}}_T \otimes \tilde{A}_R). \qquad (14)$$

Then, the vectorized received pilot signal $L_r \times 1$ at the $m^{th}$ training symbol can be written as:

$$vec\{y^{(m)}[k]\}=\Phi^{(m)}\Phi^v[k]+n_c^{(m)}[k], \qquad (15)$$

where $h^v[k]=vec\{\Delta^v[k]\} \in \mathbb{C}^{G_t G_r \times 1}$ is the sparse vector containing the complex channel gains. Moreover, this embodiment uses several training frames to get enough measurements and accurately reconstruct the sparse vector $h^v[k]$, especially in the very-low SNR regime. Therefore, when the transmitter and receiver communicate during M training steps using different pseudorandomly built precoders and combiners, equation (15) can be extended to M received signals given by:

$$\underbrace{\begin{bmatrix} y^{(1)}[k] \\ \vdots \\ y^{(M)}[k] \end{bmatrix}}_{y[k]} = \underbrace{\begin{bmatrix} \Phi^{(1)} \\ \vdots \\ \Phi^{(M)} \end{bmatrix}^T}_{\Phi} \Psi h^v[k] + \underbrace{\begin{bmatrix} n_c^{(1)}[k] \\ \vdots \\ n_c^{(M)}[k] \end{bmatrix}}_{n_c[k]}. \qquad (16)$$

Hence, the vector $h^v[k]$ can be estimated by solving the sparse reconstruction problem, i.e., $$\min \|h^v[k]\|_1 \text{ subject to } \|y[k]-\Phi\Psi h^v[k]\|_2^2 \leq \epsilon, \qquad (17)$$

where $\epsilon$ represents a tunable parameter defining the maximum error between the reconstructed channel and the received signal. In realistic scenarios, the sparsity (number of channel paths) is usually unknown, therefore the choice of $\epsilon$ is relevant to solve equation (17) and estimate the sparsity level. The choice of this parameter is explained later.

It is noted that the matrices in equation (8) exhibit the same sparse structure for all k, since the AoA and AoD do not change with frequency in the transmission bandwidth. This is an interesting property that can be leveraged when solving the compressed channel estimation problem defined by equation (17). Moreover, the supports of the virtual channel matrices $\Delta_d^v$ are denoted as $\mathcal{T}_0, \mathcal{T}_1, \ldots, \mathcal{T}_{N_c-1}$, $d=0, \ldots, N_c-1$. Then, knowing $h^v[k]=vec\{\Delta^v[k]\}$, with $$\sum_{d=0}^{N_c-1} \Delta_d^v e^{-j\frac{2\pi k}{N}d},$$

k=0, ..., K−1, the supports of $h^v[k]$ are defined as $$supp\{h^v[k]\} = \bigcup_{d=0}^{N_c-1} supp\{vec\{\Delta_d^v\}\} k = 0, \ldots, K-1, \quad (18)$$

where the union of the supports of the time-domain virtual channel matrices is due to the additive nature of the Fourier transform. Therefore, as shown in equation (18), as the union is independent of the subcarrier k, $\Delta[k]$ has the same supports for all k.

Next, the correlation matrix is discussed. To estimate multi-path components of the channel, i.e., AoAs/AoDs and channel gains, it is first needed to compute the atom, which is defined as the vector that produces the largest sum-correlation with the received signals in the measurement matrix. The sum-correlation is especially considered as the support of the different sparse vectors is the same over the K subcarriers. The correlation vector $c[k] \in \mathbb{C}^{G_t G_t}$ is given by:

$$c[k] = \Upsilon^* y[k], \quad (19)$$

where $\mathbb{C} \in \mathbb{C}^{ML_r \times G_t G_r}$, $\Upsilon = \Phi \Psi$ represents the equivalent measurement matrix which is the same for $\forall k$ and $y[k] \in \mathbb{C}^{ML_r \times 1}$ is the received signal for a given k, k=0, ..., K−1.

It is noted that if there exists a correlation between noise components, the atom estimated from the projection in equation (19) might not be the correct one. In order to compensate for this error in estimation, this embodiment considers the noise covariance matrix when performing the correlation step. In particular, the embodiment considers two arbitrary (hybrid) combiners $W_{tr}^{(m)(i)}, W_{tr}^{(m)(j)} \in \mathbb{C}^{N_r \times L_r}$ for two arbitrary training steps i,j and a given subcarrier k. Hence, the combined noise at a given training step i and subcarrier k is represented as $n_c^{(j)}[k] = W_{tr}^{(i)} * n^{(i)}[k]$, with $n^{(i)}[k] \sim \mathcal{N}(0, \sigma^2 I_{L_r})$, which results in noise cross-covariance matrix given by $\mathbb{E}\{n_c^{(i)}[k] n_c^{(j)*}[k]\} = W_{tr}^{(i)} * \sigma^2 \delta[i-j] W_{tr}^{(j)}$. It is possible to further write the noise covariance matrix of y[k] as a block diagonal matrix $C_w \in \mathbb{C}^{ML_r \times ML_r}$, $$C_w = \text{blkdiag}\{W_{tr}^{(1)} * W_{tr}^{(1)}, \ldots, W_{tr}^{(M)} * W_{tr}^{(M)}\}. \quad (21)$$

Moreover, a Cholesky factorization can be used to factorize matrix $C_w$ into $C_w = D_w * D_w$, where $D_w \in \mathbb{C}^{ML_r \times ML_r}$ is an upper triangular matrix. Then, by taking into consideration the noise covariance matrix, the correlation step is given by $$c[k] = \Upsilon_w^* y_w[k], \quad (21)$$

where $\Upsilon_w \in \mathbb{C}^{ML_r \times G_t G_r}$ represents the whitened measurement matrix given by $\Upsilon_w = D_w^{-*} \Upsilon$. The $ML_r \times 1$ whitened received signal $y_w[k]$ is given by $[k] = D_w^{-*} y[k]$. The matrix $D_w^{-1} \in \mathbb{C}^{ML_r \times ML_r}$ is given by $D_w^{-1} = \text{blkdiag}\{(D_w^{(1)})^{-1}, \ldots, (D_w^{(M)})^{-1}\}$, where $(D_w^{(m)})^{-1}$ can be considered as a frequency-flat baseband combiner $W_{BB,tr}^{(m)}$ 352 used by the receiver 207 in the m-th training step. Therefore, by applying the whitened measurement matrix, the resulting correlation would simultaneously whiten the spatial noise components and estimate a more accurate support index in the sparse vectors $h^v[k]$.

Next, the deep learning and compressive-sensing based Channel Estimation (DL-CS-CE) methods are now discussed. To solve the CS channel estimation problem formulated above (e.g., equation (21)), two DL-based algorithms are introduced. Both methods leverage the common support between the channel matrices for every subcarrier and provide different complexity-performance trade-offs. The former simultaneously estimate the supports using an offline-trained DnCNN (note that other machine learning systems may be used instead of the DnCNN, for example, a convolutional neural network, CNN, or any neural network, NN, system; also the system may not be a denoise convolutional system; the DnCNN system is chosen herein as an example only) and then reconstructs the channel. On the other hand, the latter applies further finetuning to accurately estimate the AoAs and AoDs with higher resolution dictionary matrices while keeping the computational complexity low.

Figure 4:
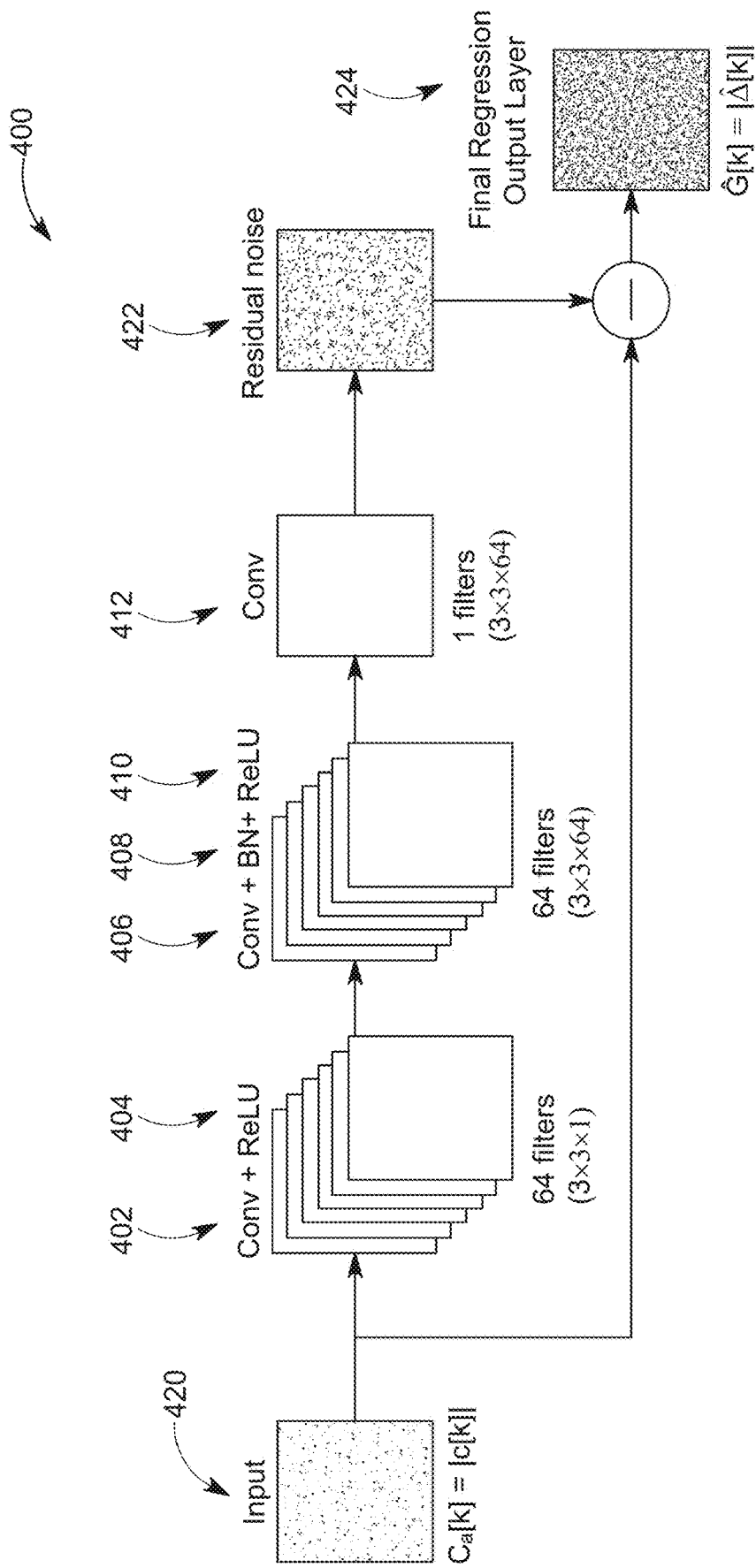
FIG. 4 schematically illustrates a denoising convolutional neural network (DnCNN) for multicarrier channel amplitude estimation.

First, the offline training and the online deployment of the DnCNN is discussed. Before detailing the two novel methods, some insights are provided into the considered DnCNN architecture as well as its offline training and online deployment. Starting with the DnCNN architecture, FIG. 4 illustrates the network architecture of the DnCNN denoiser 400, which includes $L_C$ convolutional (Conv) layers. Each layer uses $c_{CL}^{(l)}$ different $D_x^{(l)} \times D_y^{(l)} \times D_z^{(l)}$ filters. The first convolutional layer 402 is followed by a rectified linear unit (ReLU) 404. The succeeding $L_C-2$ convolutional layers 406 are followed by batch-normalization (BN) 408 and a ReLU 410. The final $L_C^{th}$ convolutional layer 412 uses one separate $D_x^{(L_C)} \times D_y^{(L_C)} \times D^{L_C}$ filter to reconstruct the signal. Here, $D_x^{(l)}$, $D_y^{(l)}$ and $D_z^{(l)}$ are the convolutional kernel dimensions, and $c_{CL}^{(l)}$ is the number of filters in the $l^{th}$ layer. FIG. 4 presents three pseudo-color images, the noisy channel 420 (the input), the residual noise 422, and the estimated output channel 424. The DnCNN 400 considers the amplitude of the correlation $G_r \times G_t$ matrix, i.e., $$C_\alpha[k] = \text{vec 2 mat}(|c[k]|, [G_r, G_t]), \forall k, \quad (22)$$

as input and produces residual noise as an output, rather than the estimated channel amplitudes, where a $G_r \times G_t$ matrix of channel amplitudes is defined as:

$$G[k] = |\Delta^v[k]| \in \mathbb{R}^{G_r \times G_t}, \forall k, \quad (23)$$

The DnCNN aims to learn a mapping function $\mathcal{F}(C_\alpha[k]) = G[k]$ to predict the latent clean image G[k] from the noisy observation $C_\alpha[k]$. This embodiment adopts the residual learning formulation to train a residual mapping $\mathcal{R}(C_\alpha[k]) \approx V$ where V is the residual noise, and then $G[k] = C_\alpha[k] - \mathcal{R}(C_\alpha[k])$. Instead of learning a mapping directly from a noisy image 420 to a denoised image 424, learning the residual noise 422 and subtracting it from the noisy image is beneficial. Furthermore, the averaged mean squared error between the desired residual image 422 and estimated ones from the noisy input 420 is adopted as the loss function to learn the trainable parameters $\Theta$ of the DnCNN. This loss function is given by $$\ell(\Theta) = \frac{1}{2N} \sum_{i=1}^{N} \|\mathcal{R}(C_\alpha[k]^i; \Theta) - (C_\alpha[k]^i - G[k]^i)\|_F^2, \quad (24)$$

where $(C_\alpha[k]^i, G[k]^i)_{i=1}^N$ represents N noisy-clean training patch pairs. This method is also known as residual learning and renders the DnCNN to remove the highly structured natural image rather than the unstructured noise. Consequently, residual learning improves both the training times and accuracy of a network. In this way, combining batch normalization and residual learning techniques can accelerate the training speed and improve the denoising performance. Besides, batch normalization has been shown to offer some merits for residual learning, such as alleviating the internal covariate shift problem.

Figure 5:
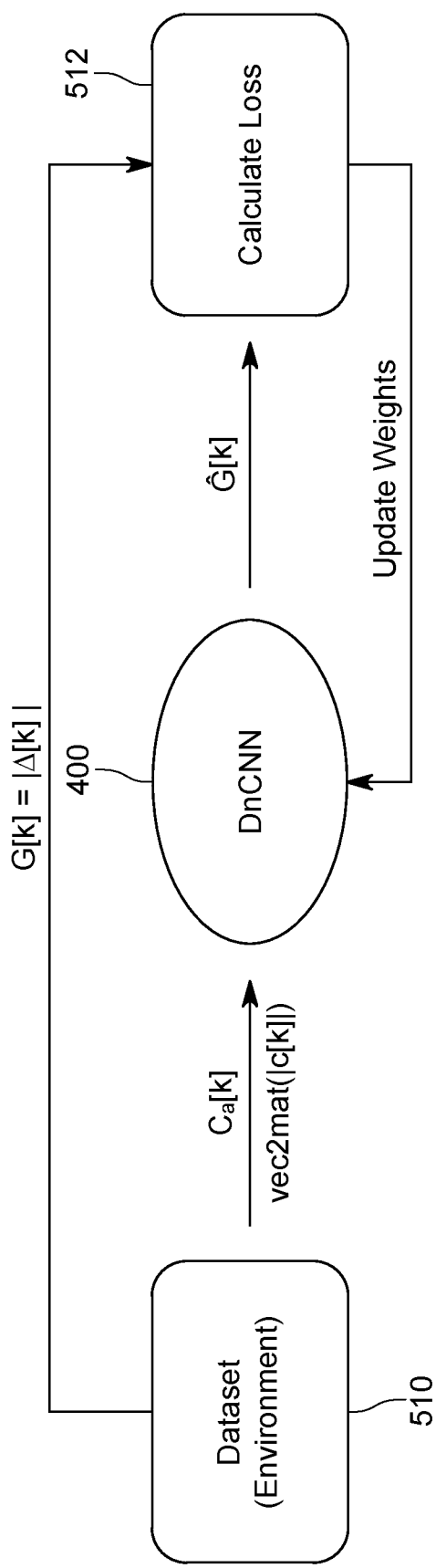
FIG. 5 schematically illustrates the offline training of the DnCNN network.

The offline training of the DnCNN network is now discussed with regard to FIG. 5. During the offline training of the DnCNN network 400, the dataset 510 of $C_\alpha[k]$, $\forall k$ and G[k], ∀k is generated based on the realistic Raymobtime dataset for mmWave frequency selective channel environment. Note that Raymobtime is developed based on collecting realistic datasets collected by ray-tracing and realistic 3D scenarios that considers mobility, time, frequency, and space, and this data is publicly available. With the mmWave channel amplitude in equation (23) and the correlation of the received signals and the measurement matrix in equation (22), the training data of $C_\alpha[k]$ and G[k] can be obtained to form the set 510. In particular, the process to obtain $C_\alpha[k]$ and G[k] involves the following four steps: i) generation of channel matrices based on the mmWave channel model from the Raymobtime dataset, ii) obtaining G[k] based on equation (23), iii) computing the whitened received signal vector $y_w[k]∀k$, and iv) acquiring the amplitudes of the correlation vector c[k] and transforming it into a matrix form $C_\alpha[k]$ as described in equation (22). Then, the $C_\alpha[k]$ data is fed to the network 400 and its output Ĝ[k] is compared with the original data G[k], for adjusting the parameters of the DnCNN 400. This adjustment is based on a loss function 512, which is described by equation (24).

Figure 6:
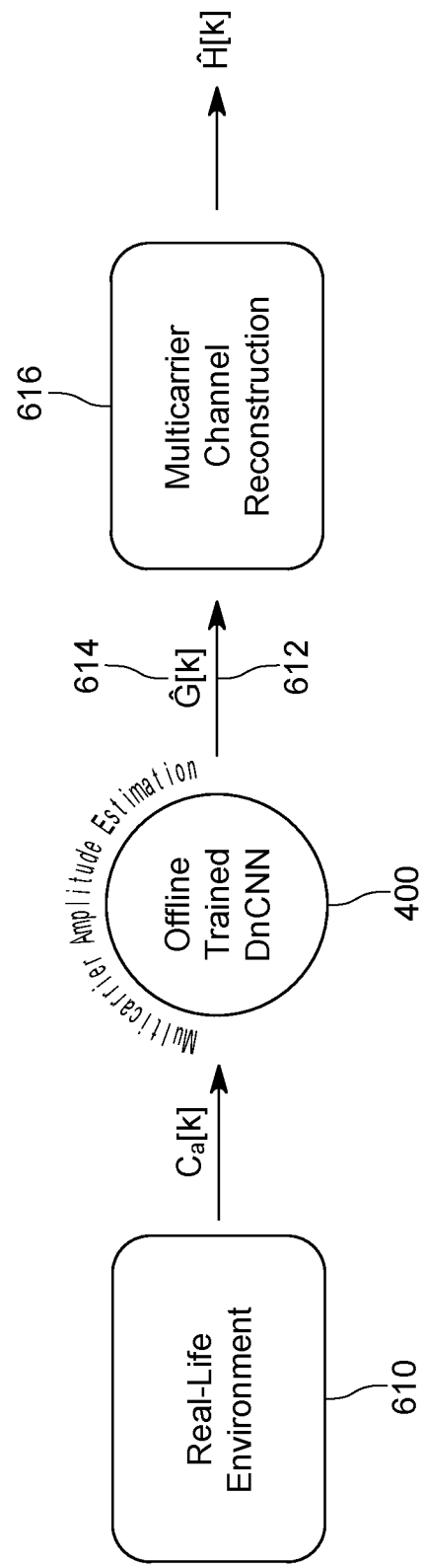
FIG. 6 schematically illustrates the online deployment of the DnCNN.

After the offline training step, the online deployment of the DnCNN follows, as illustrated in FIG. 6. During the online deployment for the DL-CS-CE method, the measured received signal $y_w[k]$ is obtained from the realistic mmWave channel environments. The $C_\alpha[k]$ is computed in step 610 based on equation (22), which is then fed to the offline-trained DnCNN 400. Then, the trained DnCNN predicts in step 612 the Ĝ[k], from which the network estimates, in step 614, the supports of Δ'[k]. Then, in step 616, the system reconstructs the multicarrier channel. It is noted that it is possible to train the DnCNN network 400 on a subset $K_p$ of K subcarriers of the amplitudes of the correlation matrices $C_\alpha[k]$, to eventually estimate the support of Δ'[k], because as previously discussed, Δ'[k] have the same support for all k. In particular, the support can be estimated if a small number of subcarriers $K_p \ll K$ is used instead. This will eliminate the need for computing $C_\alpha[k]$ for all subcarriers and eventually reduce the overall computational complexity at the cost of a negligible performance degradation, which is an advantage over the existing methods. By leveraging the triangle inequality, i.e., $\|y[k]\|_2^2 \leq \|\Phi h'[k]\|_2^2 + \|n_c[k]\|_2^2$, the $K_p$ selected signals are expected to exhibit the strongest channel response. Therefore, the $K_p$ subcarriers having largest $l_2$-norm will be exploited to derive an estimate of the support of the already defined sparse channel matrix Δ'[k], k=0, ..., K−1.

Figure 7C:
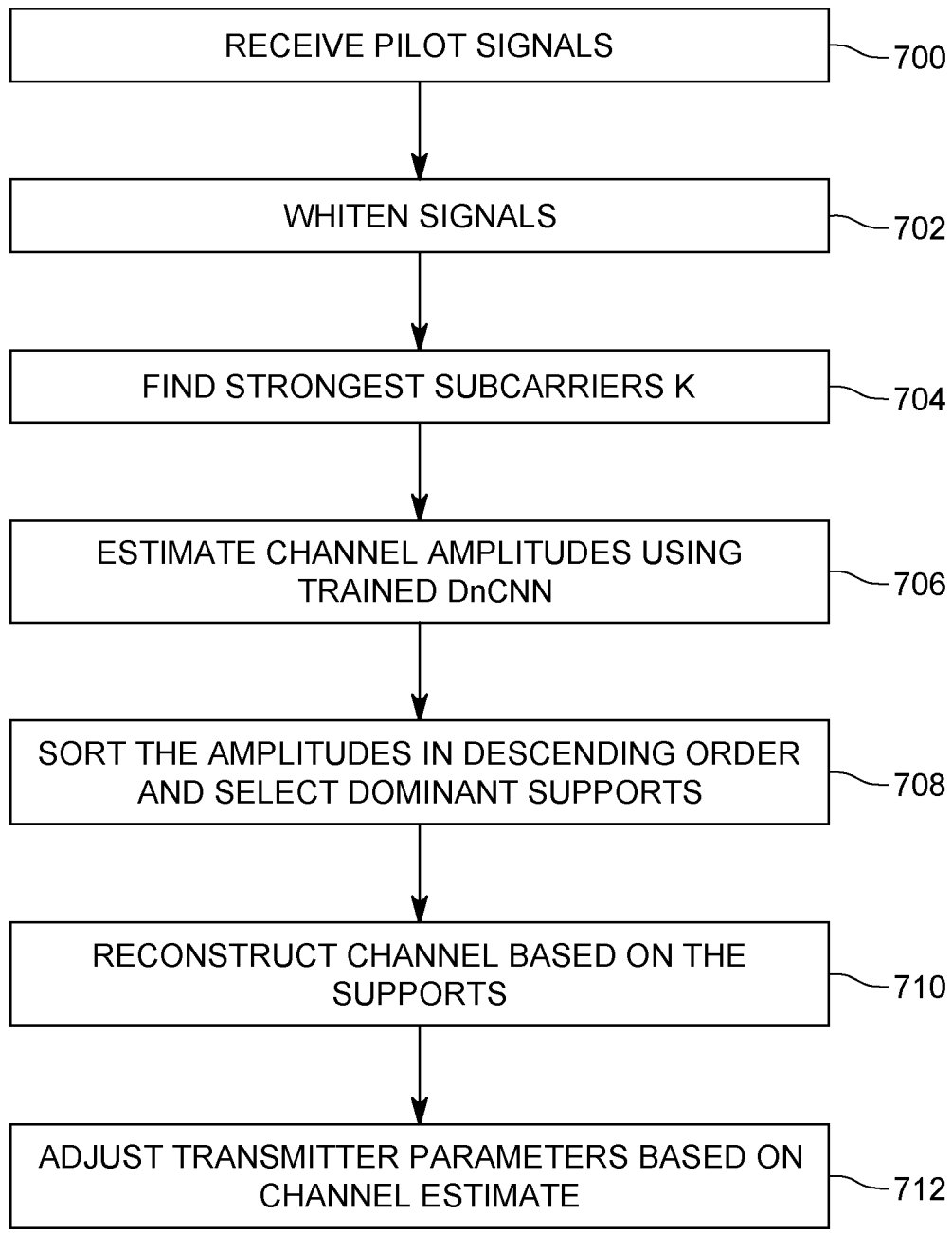

The first DL-CS-CE method is now discussed. The state-of-the-art sparse channel estimation schemes depend on greedy algorithms to sequentially detect the supports, which naturally yield suboptimal solutions. The inventors have noted this limitation of the existing algorithms and have introduced a neural network to simultaneously estimate all supports rather than sequentially. The algorithmic implementation of the proposed DL-CS-CE method is schematically illustrated in FIGS. 7A and 7B as a program code and FIG. 7C is a flow chart of the method associated with the DL-CS-CE solution. Note that this is a high-level code description of the algorithm and one skilled in the art would be inspired by this specific algorithm to implement variations or changes of it, to optimize its results and to adapt it to any communication system. While the steps illustrated in FIGS. 7A to 7C estimate the channels more accurately than the existing algorithms, some steps may be omitted and still obtain similar results. The order of some steps may be changed depending on the specific implementation of the system.

More specifically, in step 700 (see FIG. 7C) the pilot signals y[k] are received at the receiver 207. Note that the steps discussed herein may be implemented at the receiver 207, at the transmitter 209, or may be distributed between the receiver and the transmitter. Although the implementation of these steps is now discussed with regard to the receiver 207 (i.e., either the UE 206 or the base station 208), the same sequence of steps may be implemented if the channel estimation is performed at the transmitter. In step 702 (line 1 in FIG. 7A), the received signal is whitened with a whitened matrix and then a residual vector (line 2 in FIG. 7A) is initiated based on the whitened received signal. After the initialization steps performed in lines 1-3 and the computation of the whitened equivalent observation matrix (line 4 in FIG. 7A), the DL-CS-CE method includes a step 704 of finding the strongest subcarriers k of the measured signal y[k], followed by a step 706 of estimating the channel amplitudes by using the offline trained DnCNN 400 (see discussion above with regard to FIG. 5), sorting 708 the estimated channel amplitudes in descending order to select the supports of the dominant entries, and reconstructing 710 the channels according to the selected dominant entries, corresponding to the supports. After reconstructing the channel in step 710, the receiver/transmitter determines in step 712 the required parameters to be applied to the sent signal, e.g., power, amount of bandwidth, which percentage of bandwidth is allocated to each UE, etc. Steps 708 and 710 are discussed in more detail next.

Step 708, i.e., the selection of the strongest subcarriers, is represented in lines 8-11 of the algorithm shown in FIG. 7A. At these lines, the algorithm iteratively finds a subset ϒ∈K containing the $K_p$ strongest subcarriers which are expected to exhibit the strongest channel response, as explained above.

Next, an amplitude estimation is performed at lines 13 and 14 of the method. First, the system (i.e., the receiver or transmitter or both) computes the correlation vector c[k] according to equation (21) and then creates the DnCNN input $C_\alpha[k]$ by transforming the correlation vectors c[k] into a matrix form according to equation (22). In line 15, the offline trained DnCNN 400 is used as the kernel of the channel amplitude estimation to obtain the DnCNN output Ĝ[k] of size $G_r \times G_t$, which is the estimate of G[k] given by equation (23). It is worth noting that the system only uses a subset ϒ of the correlation matrices $C_\alpha[k]∀k∈ϒ$ as an input to the DnCNN 400. In line 16, the output channel amplitude estimation matrix Ĝ[k] is vectorized into the following $G_r G_t \times 1$ vector form $$\hat{g}[k] = \text{vec}(\hat{G}[k]), \forall k \in ϒ, \quad (25)$$

where the indices of the maximum amplitudes of ĝ[k] will be exploited for support detection.

Step 710 (corresponding to step 616 in FIG. 6), i.e., multicarrier channel reconstruction, detects the supports by iteratively updating the residual until the mean square error (MSE) falls below a predetermined threshold, ∈. The threshold value may be selected by the operator of the communication network and is specific of the detailed implementation of the network. More specifically, after the initialization steps in lines 19 and 20, line 21 sums the amplitudes of the predicted ĝ[k] over the subcarriers k∈𝒦 as the supports are the same for all k. Then, the INDEXSORTDESCEND function sorts the sum vector in descending order and returns a corresponding index set 𝒥, |𝒥|=$G_r G_t$. Thereafter, the "while" loop between lines 22 and 28 follows the steps below until the termination condition is satisfied.

Line 23 updates the detected support set $\hat{\mathcal{T}}$ by adding the $i^{th}$ element of ordered index set $\mathcal{I}$. Then, line 24 projects the input signal $y_w[k]\forall k$ onto the subspace given by the detected support $\mathcal{T}$ using Weighted Least-Squares (WLS) $([\Upsilon_w]_{:,\hat{\mathcal{T}}})^\dagger$, which is followed by the residual update and MSE computation in lines 25 and 26, respectively. It is also worth noting that $([\Upsilon_w]_{:,\hat{\mathcal{T}}})^\dagger$ corresponds to a WLS estimator, with the corresponding weights given by the inverse noise covariance matrix. Lastly, line 27 increments the loop index i for the next iteration. The final value of $i=|\hat{\mathcal{T}}|$ provides one desired parameter: $\hat{L}$, which is the estimate of the sufficient number of paths that guarantees MSE $>\in$, i.e., L. Thereby, this parameter is closely tied with the choice of $\in$, which is discussed later. It is noted that the "while" loop is terminated by the MSE $>\in$ condition almost all the time as $G_tG_r\gg \hat{L}$, as shown in Table II in FIG. 8 and this assumption holds because the mmWave channels are known to have a limited number of paths.

Because the support of the sparse channel vectors is already estimated by $\hat{\mathcal{T}}$, the measurement matrix can now be defined as $[\Upsilon]_{:,\hat{\mathcal{T}}}\in\mathbb{C}^{ML_r\times\hat{L}}$ such that $[\Upsilon]_{:,\hat{\mathcal{T}}}=[\Phi\Psi]_{:,\hat{\mathcal{T}}}$. Hence, the received signal model for the $k^{th}$ subcarrier can be rewritten as $$y[k]=[\Upsilon]_{:,\hat{\mathcal{T}}}\hat{\xi}[k]+\tilde{n}_c[k], \qquad (26)$$

where $\tilde{n}_c[k]\in\mathbb{C}^{ML_r\times 1}$ represents the residual noise after estimating the channel support and $\hat{\xi}[k]\in\mathbb{C}^{\hat{L}\times 1}$ is the vector containing the channel gains to be estimated after sparse recovery. If the support estimation is accurate enough, $\tilde{n}_c[k]$ will be approximately similar to the post-combining noise vector $n_c[k]$, as discussed in [19]. Note that the indices obtained by the trained DnCNN 400 may sometime be different from the actual channel support. In this case, the detected support $\hat{\mathcal{T}}$ may also be different from the actual support. Likewise, the channel gains to be estimated $\hat{\xi}[k]$, can also be different from actual vector, $\xi[k]=\text{vec}\{\text{diag}\{\Delta[k]\}\}$.

The mathematical model in equation (26) is usually considered as the General Linear Model (GLM), where the solution of $\hat{\xi}[k]$ for real parameters is provided in S. M. Kay, Fundamentals of statistical signal processing. Prentice Hall. For the case with complex valued parameters, the solution is given by:

$$\hat{\hat{\xi}}[k]=([\Upsilon]_{:,\hat{\mathcal{T}}}*C_w^{-1}[\Upsilon]_{:,\hat{\mathcal{T}}})^{-1}[\Upsilon]_{:,\hat{\mathcal{T}}}*C_w^{-1}y[k], \qquad (27)$$

which can be further reduced to $$\hat{\hat{\xi}}[k]=([\Upsilon_w]_{:,\hat{\mathcal{T}}})^\dagger y_w[k]. \qquad (28)$$

Therefore, $\hat{\hat{\xi}}[k]$ is considered as the Minimum Variance Unbiased (MVU) estimator for the complex parameter vector $\hat{\xi}[k]$, k=0, ..., K−1. Hence, it is unbiased and attains the Cramér-Rao Lower Bound (CRLB) if the support is correctly estimated. This is considered as Cramer-Rao Lower Bound of a Genie-aided estimation problem, in which the estimator knows the location of the nonzero taps i.e., $\mathcal{T}$, as if a Genie has aided the estimator with the location of the taps. Once all the supports are detected, line 29 computes the sparse channel vector $\hat{h}^v[k]$ where its non-zero elements are obtained according to $$[\hat{h}^v[k]]_{\hat{\mathcal{T}}}=([\Upsilon_w]_{:,\hat{\mathcal{T}}})^\dagger y_w[k]. \qquad (29)$$

Finally, the algorithm at line 32 reconstructs the channel based on equation (12) as follows:

$$\text{vec}\{\hat{H}[k]\}=(\bar{\tilde{A}}_T\otimes\tilde{A}_R)\text{vec}\{\hat{\Delta}^v[k]\}, \qquad (30)$$

such that $\text{vec}\{\hat{\Delta}^v\}[k]=\hat{h}^v[k]$.

This first method discussed with regard to FIGS. 7A and 7B establishes a frequency-selective channel estimation framework for mmWave MIMO systems with hybrid architecture. By considering the mmWave channel sparsity, the algorithm reaps the full advantages of both CS and DL methods. The algorithm considers the received pilot signal as an image, and then employs a denoising convolutional neural network 400 (see, for example, [20]) for channel amplitude estimation. Thereby, the pilot signal/image denoising is treated as a discriminative learning problem, i.e., separating the noise from a noisy image by feed-forward convolutional neural networks (CNNs). The main advantages behind using the CNNs are twofold: first, deep CNNs have been recognized to effectively extract image features. Second, considerable advances have been achieved on regularization and learning methods for training CNNs, including Rectifier Linear Unit (ReLU), batch normalization, and residual learning. These methods can be adopted in CNNs to speed up the training process and improve the denoising performance.

The discussed DL-CS-based channel estimation (DL-CS-CE) method exploits the information on the support coming from every subcarrier in the MIMO-OFDM system. It is executed in two steps: channel amplitude estimation through deep learning and channel reconstruction. The DnCNN is trained using real mmWave channel realizations obtained from Raymobtime. The correlation between the received signal vectors and the measurement matrix is fed into the trained DnCNN to predict the channel amplitudes. Using the obtained channel amplitudes, the indices of dominant entries of the channel are obtained, based on which the channel can be reconstructed. Unlike the existing work [19] that sequentially estimates the dominant channel entries, the present method simultaneously estimates the dominant entries (see line 15 in FIG. 7A), which is able to save in computational complexity and improve estimation performance.

The second channel estimation method is now discussed. The sparsity of $h^v[k]$ can be impaired by channel power leakage caused by the limited resolution of the chosen dictionary matrices. Although the DL-CS-CE method of FIGS. 7A to 7C provides reasonable AoD/AoA estimates, the adopted virtual quantized dictionary matrices may not obtain the exact AoDs/AoAs that really lies in the off-grid regions of the dictionary. To overcome this matter, this embodiment presents a novel method to obtain more accurate AoDs/AoAs. This new procedure is called "refined DL-CS-CE" and improves the NMSE performance of the previous method while reducing the incurring computational complexity at the same time.

Figure 9C:
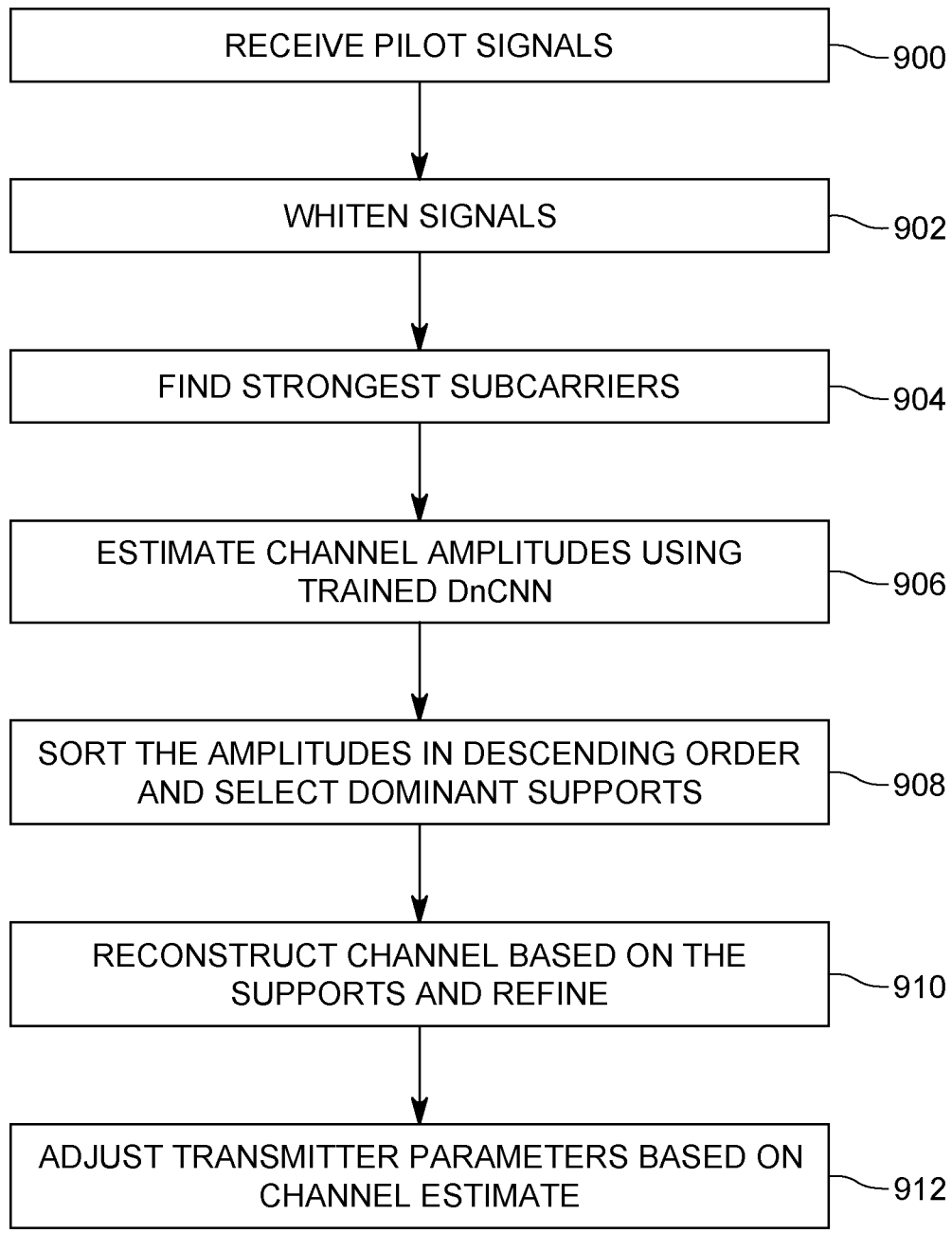

Using the superscript r for referring to the refining phase, the following higher resolution refining dictionary matrices $\tilde{A}_R^r$ and $\tilde{A}_T^r$ are considered with grid sizes $G_r^r$ and $G_t^r$, respectively. In one application, the dictionary matrices for the method of FIGS. 7A and 7B have a size of $2N_t(2N_r)$, where $N_t=16$ and $N_r=64$ in one implementation while the current method uses dictionary matrices with a size of $8N_t(8N_r)$, i.e., at least an order of magnitude larger than the previous method. Based on this notation, the refined DL-CS-CE method is expressed as Algorithm 2 in FIGS. 9A and 9B and as a flow chart in FIG. 9C. Similar to FIGS. 7A and 7B, the algorithm in FIGS. 9A and 9B is illustrated as a computer code at a high level and some steps may be omitted or more steps may be added. The computer code is provided to enable one skilled in the art to reproduce the current method and also to provide a platform from which various changes may be implemented. The method follows the same implementation as that of Algorithm 1 in FIGS. 7A and 7B except some technical differences during the channel reconstruction stage, which are now discussed.

The steps 900 to 908 and 912 of the current method illustrated in FIG. 9C are similar to the corresponding steps in FIG. 7C, and thus, their description is not repeated herein. Step 910, i.e., the Multicarrier Channel Reconstruction and Refinement differs from step 710 and this step is discussed herein. The "while" loop between lines 22 and 29 in FIG. 9A refines the path components by iterative projections. In line 23, the detected support $\mathcal{J}(i)$ is first transformed into column and row indices of a $G_r \times G_t$ matrix representing the indices $(i_{AoA}{}^d, i_{AoD}{}^d)$ of the detected AoAs and AoDs in the original lower resolution dictionary matrices $\tilde{A}_R$ and $\tilde{A}_T$, respectively. In line 24, a multi-resolution fine-tuning method REFINE is applied to enhance the resolution of the detected AoAs and AoDs. The refining procedure REFINE includes two steps, as shown between lines 36 and 39 of Algorithm 2 in FIG. 9B. These steps are now explained based on the column index set notation $\Omega_{K,q}$, where $K \in \{A, D\}$ represents arrival or departure, and $q \in \{d, r\}$ refers to detection or refinement, respectively.

The first step starts with line 36 which refines the angle components with the highest number of antennas. For instance, consider that $N_r > N_t$. By increasing the resolution of $\hat{\phi}_l$ to $G^r$ $G_r >> G_r$, the maximum projection along the refined receiving array steering matrix $\tilde{A}_R{}^r$, while the corresponding AoD $\hat{\theta}_l$ is fixed, can be expressed as $$i^r_{AoA} = \arg m_i \left[ \sum_{k \in \mathcal{K}} \left| \left( [\Upsilon_w^d]_{i, \Omega_{D,d}} \right)^* y_w[k] \right| \right]_i, \tag{31}$$

where $\Upsilon_w{}^d$ is an $ML_r \times G_r{}^r G_t$ matrix such that $\Upsilon_w{}^d = \Phi_w (\tilde{A}_T \otimes \tilde{A}_R{}^r)$, and $[\Gamma_w^d]_{:,\Omega_{D,d}}$ is an $ML_r \times G_r{}^r$ sub-matrix with the column index set defined as $\Omega_{D,d} \{i_{AoD}{}^d : i_{AoD}{}^d \cdot G_r{}^r\}$; and $i_{AoD}{}^d$ corresponds to the index of the previously detected AoD before refining. Then, line 37 continues with the remaining angle by increasing the resolution of $\hat{\theta}_l$ to $G_t{}^r >> G_r$. Similar to equation (31), the maximum projection along the refined transmit array steering matrix $\tilde{A}_T{}^r$, while the corresponding obtained refined AoA $\hat{\phi}_1$ is fixed, can be expressed as:

$$i^r_{AoD} = \arg\max_i \left[ \sum_{k \in \mathcal{K}} \left| \left( [\Gamma_w^r]_{:,\Omega_{A,r}} \right)^* y_w[k] \right| \right]_i, \tag{32}$$

where $\Upsilon_w{}^r$ is an $ML_r \times G_r{}^r G_t{}^r$ matrix such that $\Upsilon_w{}^r = \Phi_w (\tilde{A}_T{}^r \otimes \tilde{A}_R{}^r)$, and $[\Upsilon_w{}^r]_{T, \Omega_{A,r}}$ is an $ML_r \times G_t{}^r$ sub-matrix with the column index set defined as $$\Omega_{A,r} = \{0 : G_r{}^r G_t{}^r - 1\} \bmod G_t{}^r + i_{AoA}{}^r. \tag{33}$$

Here, $i_{AoA}{}^r$ is the index of the refined AoA obtained from equation (31).

The second step, which starts at line 38, proceeds to repeat the same step by substituting all angles with their corresponding refined angles, after removing the angle uncertainty caused by the detection phase. The maximum projection along the refined received array is given by:

$$i^{r*}_{AoA} = \arg\max_i \left[ \sum_{k \in \mathcal{K}} \left| \left( [\Gamma_w^r]_{:,\Omega_{D,r}} \right)^* y_w[k] \right| \right]_i, \tag{34}$$

where $\Omega_{D,r} = \{i_{AoD}{}^r : i_{AoD}{}^r \cdot G_r{}^r\}$, and $i_{AoD}{}^r$ correspond to the index obtained from the previous step in equation (32). Similarly, in line 39, $i_{AoD}{}^{r*}$ is obtained using equation (32) but by substituting $i_{AoA}{}^r$ in equation (33) with the obtained $i_{AoA}*$ (the result from equation (34)). Next, line 40 transforms the row and column indices $[i_{AoA}{}^{r*} \, i_{AoD}{}^{r*}]$ into a linear index $j*$. The refining procedure lastly updates the refined support estimation set $\hat{\mathcal{J}}$ by admitting index $j*$ into $\hat{\mathcal{J}}$.

The method shown in FIGS. 9A and 9B estimates the sufficient number of paths in line 30. This step is now discussed in more detail. After estimating the channel amplitudes using the trained DnCNN 400, it is necessary to determine the sufficient support indices representing the number of paths needed to reconstruct the channel. To solve this detection problem, some prior information is needed to compare the received signals $y[k]$ with the reconstructed signals $\hat{x}_{rec}[k] = [\Upsilon]_{:,\hat{\mathcal{J}}} \hat{\xi}[k]$. For instance, the noise variance is assumed to be known at the receiver in which the receiver can accurately estimate the noise variance before the training stage takes place. Hence, the received signal $y[k]$ can be approximately modeled as $y[k] \approx \hat{x}_{rec}[k] + \tilde{n}_c[k]$, since $\hat{x}_{rec}[k]$ is an estimate of the mean of $y[k]$.

The estimation of the noise variance can be formulated as a Maximum-Likelihood estimation problem:

$$\hat{\sigma}^2_{ML} = \arg m_{\sigma^2} \mathcal{L}(y, \hat{x}_{rec}, \sigma^2), \tag{35}$$

where $y \triangleq \text{vec}\{y[0], \ldots, y[K-1]\}$ represents the complete received signal, $\hat{x}_{rec} \triangleq \text{vec}\{\hat{x}_{rec}[0], \ldots, \hat{x}_{rec}[K-1]\}$ is the complete reconstructed signal, and $\mathcal{L}(y, \hat{x}_{rec}, \sigma^2)$ denotes the log likelihood function of y. This log likelihood function is given by $$\mathcal{L}(y, \hat{x}_{rec}, \sigma^2) = \tag{36}$$
$$-KML_r \ln \pi \sigma^2 - \ln \det\{C_w\} - \frac{1}{\sigma^2} \sum_{k=0}^{K-1} (y[k] - \hat{x}_{rec}[k])^* C_w^{-1} (y[k] - \hat{x}_{rec}[k]).$$

The ML estimator of the noise variance is then obtained by taking the partial derivative with respect to $\sigma^2$ where $\partial \mathcal{L}(y, \hat{x}_{rec}, \sigma^2) / \partial \sigma^2 = 0$. Hence, $\widehat{\sigma^2}$ ML is given by $$\widehat{\sigma^2}_{ML} = \frac{1}{KML_r} \sum_{k=0}^{K-1} \frac{(y[k] - \hat{x}_{rec}[k])^* C_w^{-1} (y[k] - \hat{x}_{rec}[k])}{r^*[k]r[k]} \tag{37}$$

where the $ML_r \times 1$ vector $r[k] \triangleq y_w[k] - D_w^{-*} \hat{x}_{rec}$ is the residual. One can note that the residual $r[k]$ can also be expressed as $r[k] = (I_{ML_r} - P) y_w[k]$, where $P \in \mathbb{C}^{ML_r \times ML_r}$ represents the projection matrix given by $P = [\Upsilon_w]_{:,\hat{\mathcal{J}}}{}^\dagger [\Upsilon_w]_{:,\hat{\mathcal{J}}}$.

Therefore, for a sufficient number of iterations, $\hat{L}$ sufficient paths are expected to be detected as those L paths correspond to the dominant $\hat{L}$ entries of $\Sigma_{k \in \mathcal{K}} |h^v[k]|$. Moreover, the detection process is achieved when the estimated noise variance becomes equal to the true noise variance of the received signal by setting $\epsilon$ to $\sigma^2$ in equation (17).

Next, the convergence of the two methods illustrated in FIGS. 7A and 9A to a local optimum is discussed, which is then followed by their step-by-step computational complexity analysis. Starting with the convergence analysis, it is assumed that the dictionary sizes $G_t$ and $G_r$ are large enough to have the coarsely quantized AoAs/AoDs accurately estimated. For the sake of simplicity, the convergence analysis is built based on the notation for Algorithm 1, which is also applicable for Algorithm 2. In order to ensure convergence to a local optimum, the energy of the residual computed at the $n+1$th iteration should be strictly smaller than that of the previous $n^{th}$ iteration, i.e., $$\|r^{(n+1)}[k]\|_2^2 < \|r^{(n)}[k]\|_2^2, \quad k=0,\ldots,K-1. \tag{38}$$

Based on the residual computation for SW-OMP in [19], the residual for a given iteration n is expressed as $$r^{(n)}[k] = (I_{ML_r} - P^{(n)}) y_w[k] \tag{39}$$

where $P^{(n)} \in \mathbb{C}^{ML_r \times ML_r}$ corresponds to a projection matrix given by $P^{(n)} \triangleq [\Upsilon_w]_{:,\hat{T}^{(n)}} [\Upsilon_w]_{:,\hat{T}^{(n)}}^\dagger$. It is worth mentioning that the residual $r^{(n)}[k]$ is the vector resulting from projecting $y_w[k]$ onto the subspace orthogonal to the column space of $[\Upsilon_w]_{:,\hat{T}^{(n)}}$. Moreover, it is possible to use the projection onto the column space of $[\Upsilon_w]_{:,\hat{T}^{(n)}}$ to rewrite the condition in equation (38) as follows:

$$\|P^{(n+1)} y_w[k]\|_2^2 > \|P^{(n)} y_w[k]\|_2^2. \tag{40}$$

Following the notation used in Algorithm 1, the term inside the $l_2$-norm on the left side of equation (40) can be expressed as $$P^{(n+1)} y_w[k] = [[\Upsilon_w]_{:,\hat{T}^{(n)}} [\Upsilon_w]_{:,\hat{p}^{(n+1)*}}] \times [[\Upsilon_w]_{:,\hat{T}^{(n)}} [\Upsilon_w]_{:,\hat{p}^{(n+1)*}}]^\dagger y_w[k], \tag{41}$$

where $\hat{p}^{(n+1)*}$ is the estimate for the support index found during the $n+1^{th}$ iteration, such that $\hat{p}^{(n+1)*} \notin \hat{T}^{(n)}$.

By using the formula for the inverse of a 2×2 block matrix, the projection matrix $P^{(n+1)}$ can be recursively written as a function of $P^{(n)}$ as $$P^{(n+1)} = P^{(n)} + \underbrace{\frac{(I_{ML_r} - P^{(n)}) [\Upsilon_w]_{:,\hat{p}^{(n+1)*}} [\Upsilon_w]^*_{:,\hat{p}^{(n+1)*}} (I_{ML_r} - P^{(n)})}{[\Upsilon_w]^*_{:,\hat{p}^{(n+1)*}} (I_{ML_r} - P^{(n)}) [\Upsilon_w]_{:,\hat{p}^{(n+1)*}}}}_{\Delta P^{(n+1)}}, \tag{42}$$

with $\Delta P^{(n+1)} \in \mathbb{C}^{ML_r \times ML_r}$ being another projection matrix that considers the relation between the projections at the $n^{th}$ and $n+1^{th}$ iterations. Equation (42) can be shown to fulfill the orthogonality principle, i.e., $P^{(n+1)} \Delta P^{(n+1)} = 0$. The left-handed term in equation (40) then can be expressed as:

$$\|P^{(n+1)} y_w[k]\|_2^2 = \|P^{(n)} y_w[k] + \Delta P^{(n+1)} y_w[k]\|_2^2 \tag{43}$$

$$= \|P^{(n)} y_w[k]\|_2^2 + \|\Delta P^{(n+1)} y_w[k]\|_2^2,$$

which satisfies the triangle equality. Moreover, $\Delta P^{(n+1)}$ is idempotent and thus, using linear algebraic manipulations, it can be shown that $\Delta P^{(n+1)} = (\Delta P^{(n+1)})^2$. Hence, the eigenvalues of $\Delta P^{(n+1)}$ are either 0 or 1, thereby, $\|P^{(n+1)} y_w[k]\|_2^2 > \|P^{(n)} y_w[k]\|_2^2$. Since the condition in equation (40) is satisfied, the proposed algorithms are therefore guaranteed to converge to a local optimum. Moreover, the average number of sufficient iterations $|\hat{T}| = \hat{L}$ for a range of SNR values (not shown) indicate that the proposed support detection method using the trained DnCNN needs few iterations to converge.

The refined DL-CS-CE method exploits the spatially common sparsity within the system bandwidth and a channel reconstruction with a low complexity multi-resolution fine-tuning approach is developed that further improves NMSE performance by enhancing the accuracy of the estimated AoAs/AoDs. The channel reconstruction is performed by consuming a very small amount of pilot training frames, which significantly reduces the training overhead and computational complexity.

The computational analysis or computational complexity for Algorithm 1 and Algorithm 2 is now discussed. For comparison purposes, the overall computational complexity of SW-OMP [19] was used as a benchmark. Because some steps can be performed before running the channel estimation algorithms, the inventors will distinguish between online and offline operations. For instance, the matrices $\Upsilon_w = D_w^{-*} \Upsilon$, $C_w$, $D_w$, $\Upsilon_w^d$, and $\Upsilon_w^r$ can be computed offline before the explicit channel estimation. Besides, the computational complexity of the proposed DnCNN arises from both online deployment and offline training. Although the online complexity is easier to compute, the offline training complexity is still an open issue due to a more involved implementation of the backpropagation process during training. Therefore, only the complexity of the online deployment was considered, which is based on simple matrix-vector multiplications.

For a deep neural network with $L_C$ convolutional layers, the total time complexity is given by:

$$O\left(\sum_{l=1}^{L_C} D_x^{(l)} D_y^{(l)} D_z^{(l)} b_x^{(l)} b_y^{(l)} c_{CL}^{(l-1)} c_{CL}^{(l)}\right), \tag{I}$$

where $D_x^{(l)}$, $D_y^{(l)}$ and $D_z^{(l)}$ are the convolutional kernel dimensions, $b_x^{(l)}$ and $b_y^{(l)}$ are the dimensions of the $l^{th}$ convolutional layer output, and $c_{CL}^{(l)}$ is the number of filters in the $l^{th}$ layer. It is noted that DL enjoys the advantages of graphics processing units (GPUs) and parallel processing, and hence, the overall time complexity is dominated by the analytical operations performed in the proposed algorithms.

Moreover, it was observed that the overall computational complexity of the DL-CS-CE method is lower than SW-OMP, especially for small grid sizes (for instance, when $G_t$ and $G_r$ are twice the size of the transmit and receive antennas). Moreover, when the refined algorithm is applied with the new refining higher resolution $G_t^r$ and $G_r^r$, the computational complexity is still less than that of SW-OMP applied with the same higher resolution grid sizes applied ($G_t^r$ and $G_r^r$).

Next, the inventors evaluated the performance of the proposed algorithms and compared empirical results with benchmark frequency-domain channel estimation algorithms, including the SW-OMP. The results are obtained through extensive Monte Carlo simulations to evaluate the average normalized mean squared error (NMSE), and the ergodic rate as a function of SNR and the number of training frames M. The simulations are performed based on realistic channel realizations from Raymobtime channel datasets.

The main parameters used for system configuration are as follows. The phase-shifters used in both the transmitter and the receiver are assumed to have $N_Q$ quantization bits, so that the entries of the training vectors $f_{tr}^{(m)}$, $w_{tr}^{(m)}$), $m=1, 2, \ldots, M$ are drawn from the set $$\mathcal{A} = \left\{0, \frac{2\pi}{2^{N_Q}}, \ldots, \frac{2\pi(2^{N_Q}-1)}{2^{N_Q}}\right\}.$$

The number of quantization bits is set to $N_Q=2$. The bandlimiting filter $P_{rc}(t)$ is assumed to be a raised-cosine filter with a roll-off factor of 0.8.

The DnCNN adopted in the above discussed embodiments has $L_C=3$ convolutional layers. The first convolutional layer uses $C_{CL}^1=64$ different 3×3×1 filters, as schematically illustrated in FIG. 4. The succeeding convolutional layer uses 64 different 3×3×64 filters. The final convolutional layer uses one separate 3×3×64 filter. Moreover, the dataset was randomly divided into the training set and the validation set, where the size of the training set is 70% of the total set and the validation set is the other 30%. The adaptive moment estimation (Adam) optimizer was adopted to train the DnCNN. The DnCNN is trained for 10 epochs, where 256 mini-batches are utilized in each epoch. The learning rate is set to 0.01. The training process terminates when the validation accuracy does not improve in ten consecutive iterations. Unless stated explicitly otherwise, the default system parameters used throughout the experimental simulations are summarized in Table III in FIG. 10, where $\mathcal{U}(\cdot,\cdot)$ represents the uniform distribution.

First, a comparison of the normalized mean squared errors (NMSE) is performed for the channel estimate $\hat{H}[k][k]$, which is expressed for a given realization as $$NMSE = \frac{\sum_{k=0}^{K-1} \|\hat{H}[k] - H[k]\|_F^2}{\sum_{k=0}^{K-1} \|H[k]\|_F^2}. \quad (45)$$

The NMSE is considered the baseline metric to compute the proposed algorithms' performance and will be averaged over many channel realizations. The normalized CRLB (NCRLB), from which the supports are perfectly estimated, is also provided to compare each algorithm's average performance with the lowest achievable NMSE. The average NMSE is compared versus the SNR obtained for the different channel estimation algorithms in FIGS. 11A to 11C for a practical SNR range of −15 dB to 5 dB and three different lengths of training frames M={100, 80, 60}. It is worth noting that the choice of the SNR range is based on the fact that the SNR expected in mmWave communication systems is in the order of −20 dB up to 0 dB. Using a large number of training frames M increases the performance at the cost of both higher overhead and computational complexity since the complexity of estimating the support, channel gains, and noise variance grows linearly with $L_rM$.

Figure 11A:
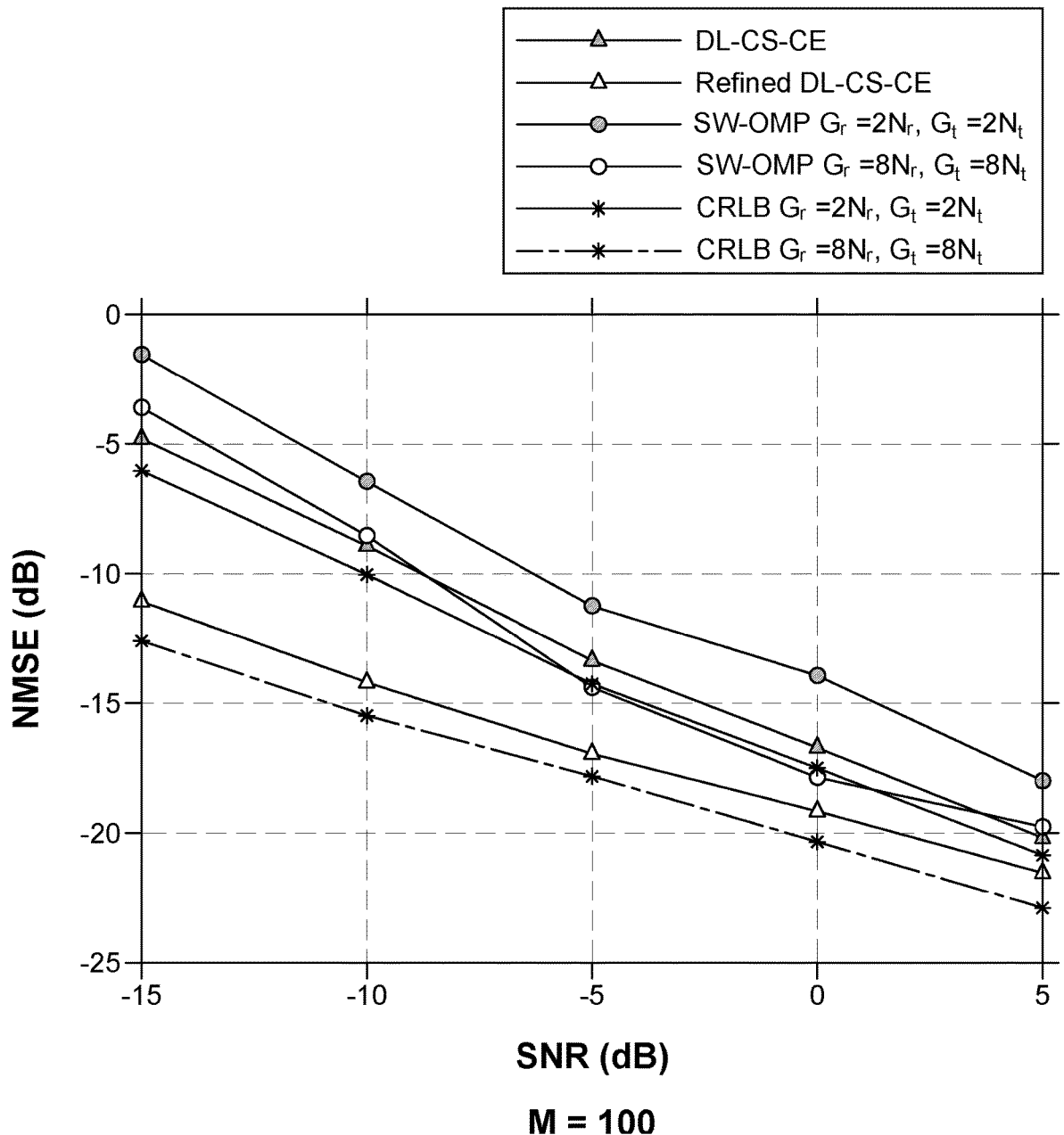
FIGS. 11A to 11C show the normalized mean-squared error (NMSE) vs. signal-to-noise ratio (SNR) for the DL-CS-CE method, the refined DL-CS-CE method, and the SW-OMP for ($N_t$=16, $N_r$=64, K=16)
Figure 11B:
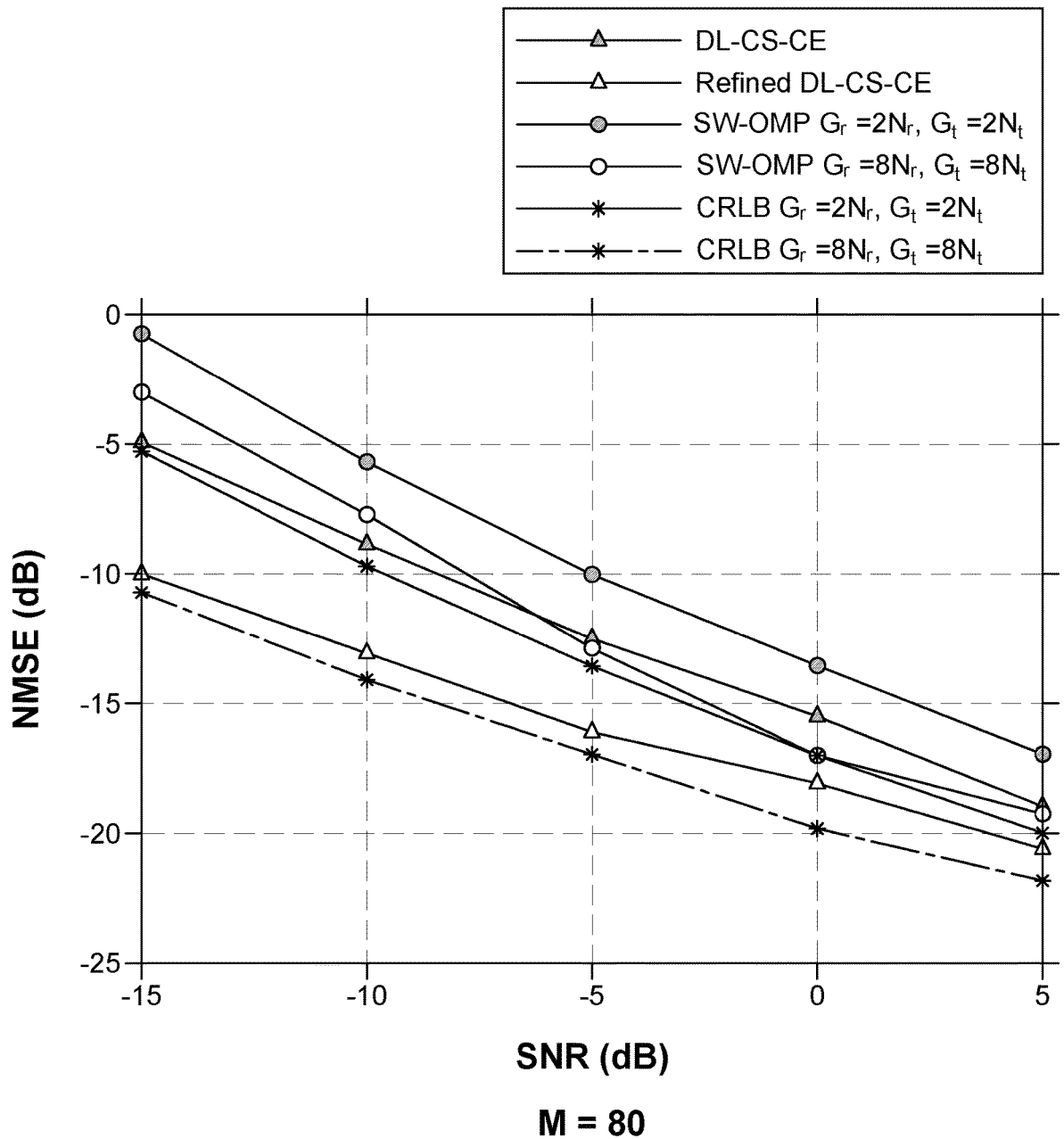
Figure 11C:
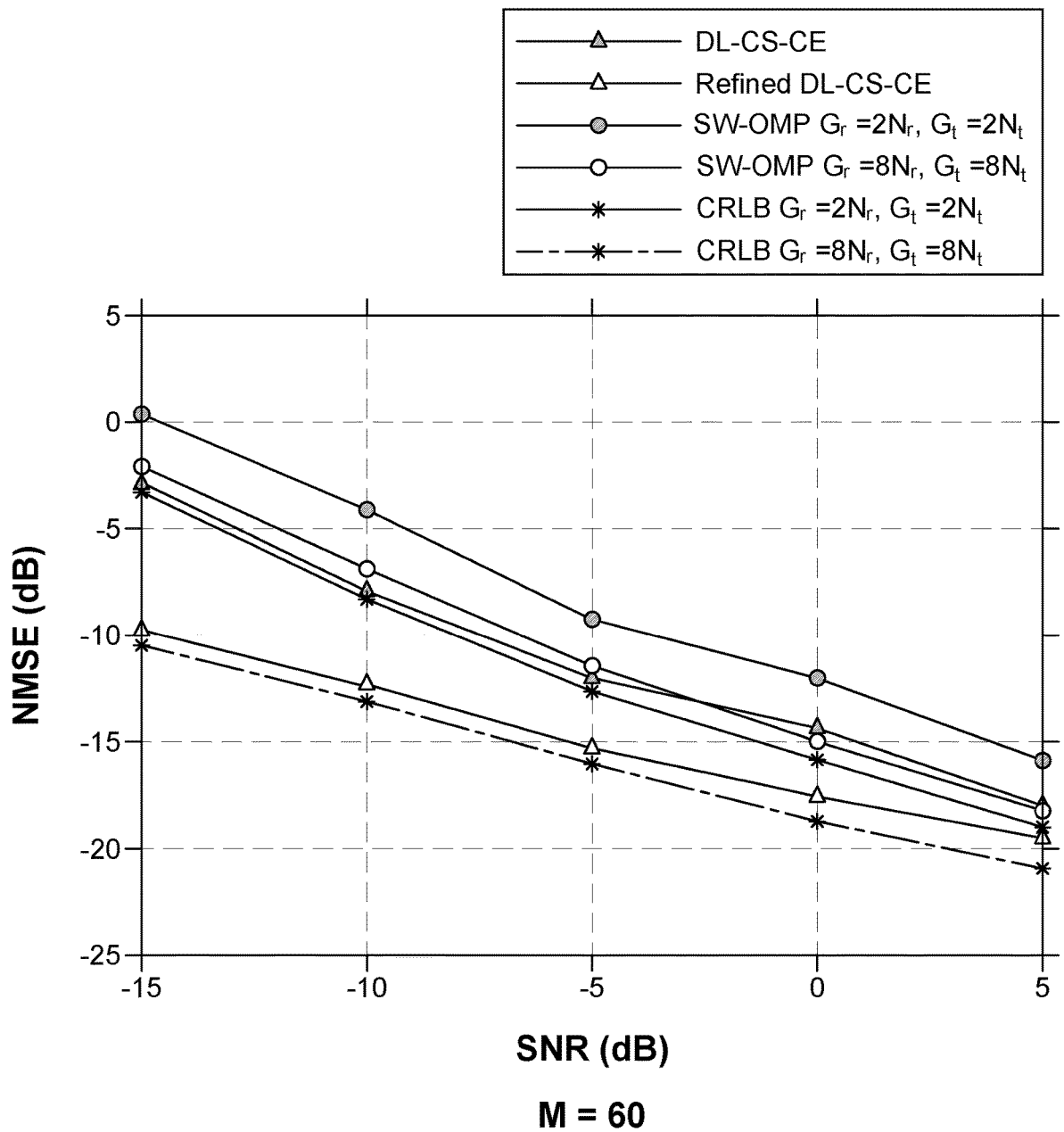

The results in FIGS. 11A to 11C show that the refined DL-CS-CE method performs the best, achieving NMSE values very close to the NCRLB (around 1 dB gap). The performance difference between SW-OMP and the proposed novel methods is noticeable, which comes from the fact that SW-OMP estimates the mmWave channel dominant entries sequentially rather than simultaneously. The DL-CS-CE method delivers an NMSE lower than that of SW-OMP by −3 dB. The refined DL-CS-CE method achieves even lower NMSE values, below −10 dB, especially for low SNR values such as SNR=−15 dB whereas the SW-OMP with higher resolution grid sizes achieves NMSE around −3 dB and −4 dB for SNR=−15 dB.

Figure 12:
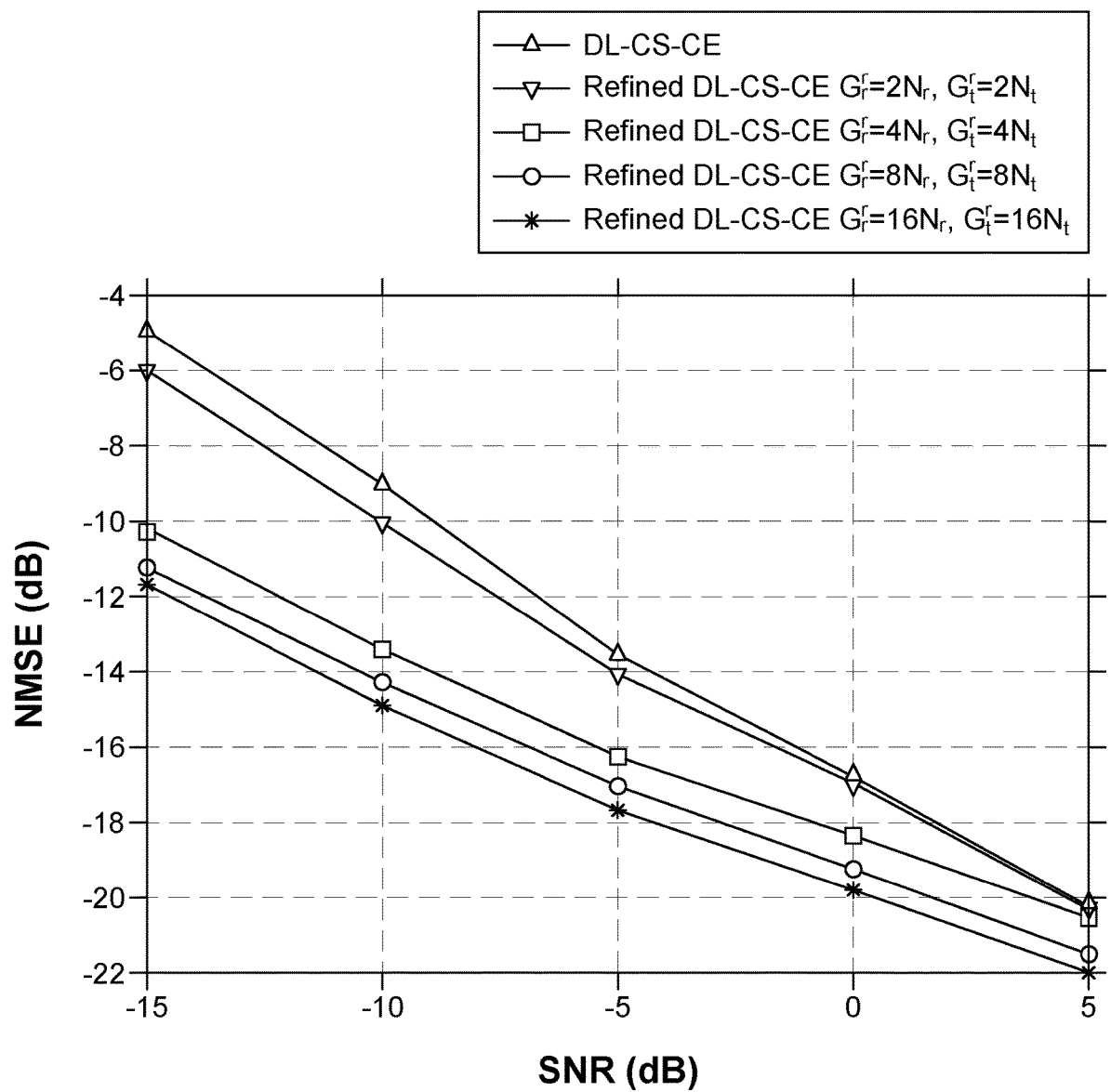
FIG. 12 shows the NMSE vs. SNR for the DL-CS-CE method and the refined DL-CS-CE method under different refining grid sizes of $G_t^r$={$2N_t$, $4N_t$, $8N_t$, $16N_t$} and $G_r^r$={$2N_r$, $4N_r$, $8N_r$, $16N_r$}($N_t$=16, $N_r$=64, K=16, M=100)

In FIG. 12, the NMSE of the DL-CS-CE method with $G_r=2N_r$ and $G_t=2N_t$ is compared to the refined DL-CS-CE method with refined grid sizes $G_r=\{2N_r, 4N_r, 8N_r, 16N_r\}$ and $G_t^r=\{2N_r, 4N_r, 8N_r, 16N_r\}$. It is noted from this figure that setting the dictionary sizes to twice the number of antennas at transmitter and receiver is not enough to estimate the exact AoDs/AoAs that lie in the off grid regions of the dictionary. At this very point, the refining method introduced in Algorithm 2 is shown to greatly enhance the NMSE performance especially for the low SNR regime, at the cost of increased computational complexity as the refining resolution increases. Hence, a trade-off exists between attaining good NMSE performance and keeping the computational complexity order low. However, even with the proposed refining approach, the complexity remains lower than that of the SW-OMP for the same high resolution dictionary matrices by at least two orders of magnitude. For instance, by taking M=100, $K_p=K/4$, $G_t^r=8N_t$, and $G_r^r=8N_r$, the complexity order of SW-OMP is $\mathcal{O}(K(G_r^rG_t^r)ML_rL)=\mathcal{O}(6.7\times10^9)$, while the complexity order of the refined DLCS-CE method is $\mathcal{O}(K_pG_r^rML_rL)=\mathcal{O}(1.3\times10^7)$. Moreover, FIG. 12 shows that as the refining resolution increases (i.e., $G_r^r>8N_r$, $G_t^r>8N_t$), the NMSE enhancement becomes gradual as no further gains are attained from further refinement.

Figure 13:
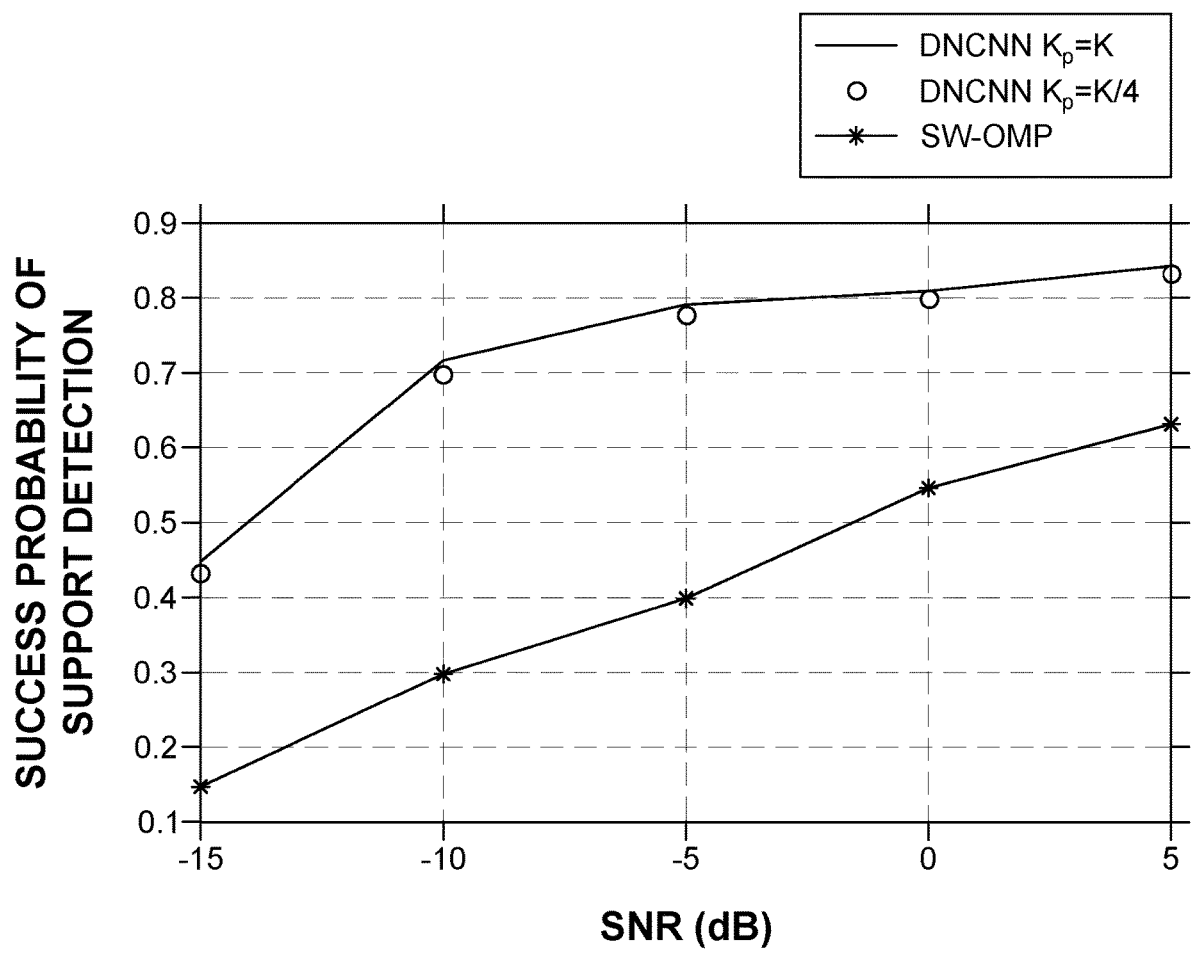
FIG. 13 shows the probability of successfully detecting the supports vs. SNR for the DL-CS-CE method, the refined DL-CS-CE method, and the SW-OMP for ($N_t$=16, $N_r$=64, K=16, M=100)

Next, a comparison is performed in FIG. 13 between the successful support detection probability versus SNR for the proposed DnCNN-based amplitude estimation and that of the traditional SW-OMP method. It can be seen that the proposed DnCNN outperforms the SW-OMP over the whole SNR range as the trained DnCNN can efficiently denoise the correlated input image and obtain a sparse matrix of the channel amplitudes. From this denoised sparse matrix, the indices of the supports (i.e., dominant entries of the obtained sparse matrix) are detected. Moreover, the comparison shows that when $K_p<<K$, the support detection is not affected, since as previously shown, $\Delta[k]$ has the same support for all k. Therefore, it is possible to reduce the computational complexity since there is no need to compute the correlation step (given in equation (21)) for all subcarriers. Thus, a smaller subset of subcarriers can also provide a high probability of correct support detection.

Next, the spectral effective comparison is computed by assuming fully-digital precoding and combining. In this way, using estimates for the $N_s$ dominant left and right singular vectors of the channel estimate gives K parallel effective channels $H_{eff}[k]=[\hat{U}[k]]_{:,1:N_s}^* H[k][\hat{V}[k]]_{:,1:N_s}$. Accordingly, the average spectral efficiency can be expressed as $$R = \frac{1}{K}\sum_{k=0}^{K-1}\sum_{n=1}^{N_s}\log_2\left(1 + \frac{SNR}{N_s}\lambda_n(H_{eff}[k])^2\right), \quad (46)$$

with $\lambda_n(H_{eff}[k])$, n=1, ..., $N_s$ the eigenvalues of each effective channel $H_{eff}[k]$.

Figure 14:
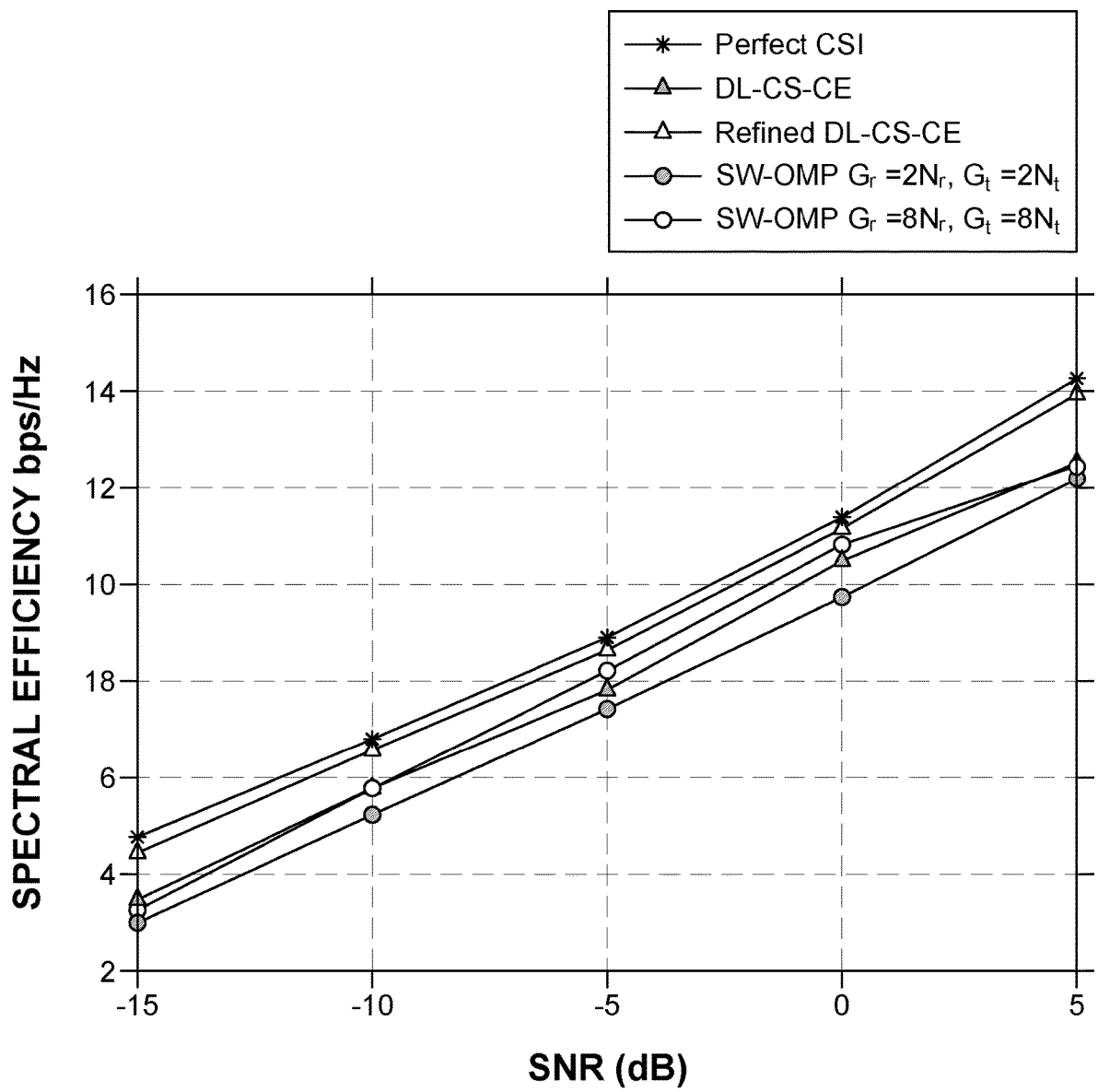
FIG. 14 shows the spectral efficiency vs. SNR for ($N_t$=16, $N_r$=64, K=16, M=100)

FIG. 14 shows the achievable spectral efficiency as a function of the SNR for the different channel estimation algorithms. The proposed DL-CS-CE method provides at least 3.6% performance improvement over the SW-OMP. The refined DL-CS-CE method provides near-optimal achievable rates with at least 12.6% performance improvement over the other schemes. The spectral efficiency gap of the different schemes is smaller than that of the NMSE gap, since the NMSE performance is much more sensitive to the success rate of the sparse recovery. However, the spectral efficiency performance is determined by the beamforming gain and is less sensitive to the success rate of the sparse recovery.

Figure 15:
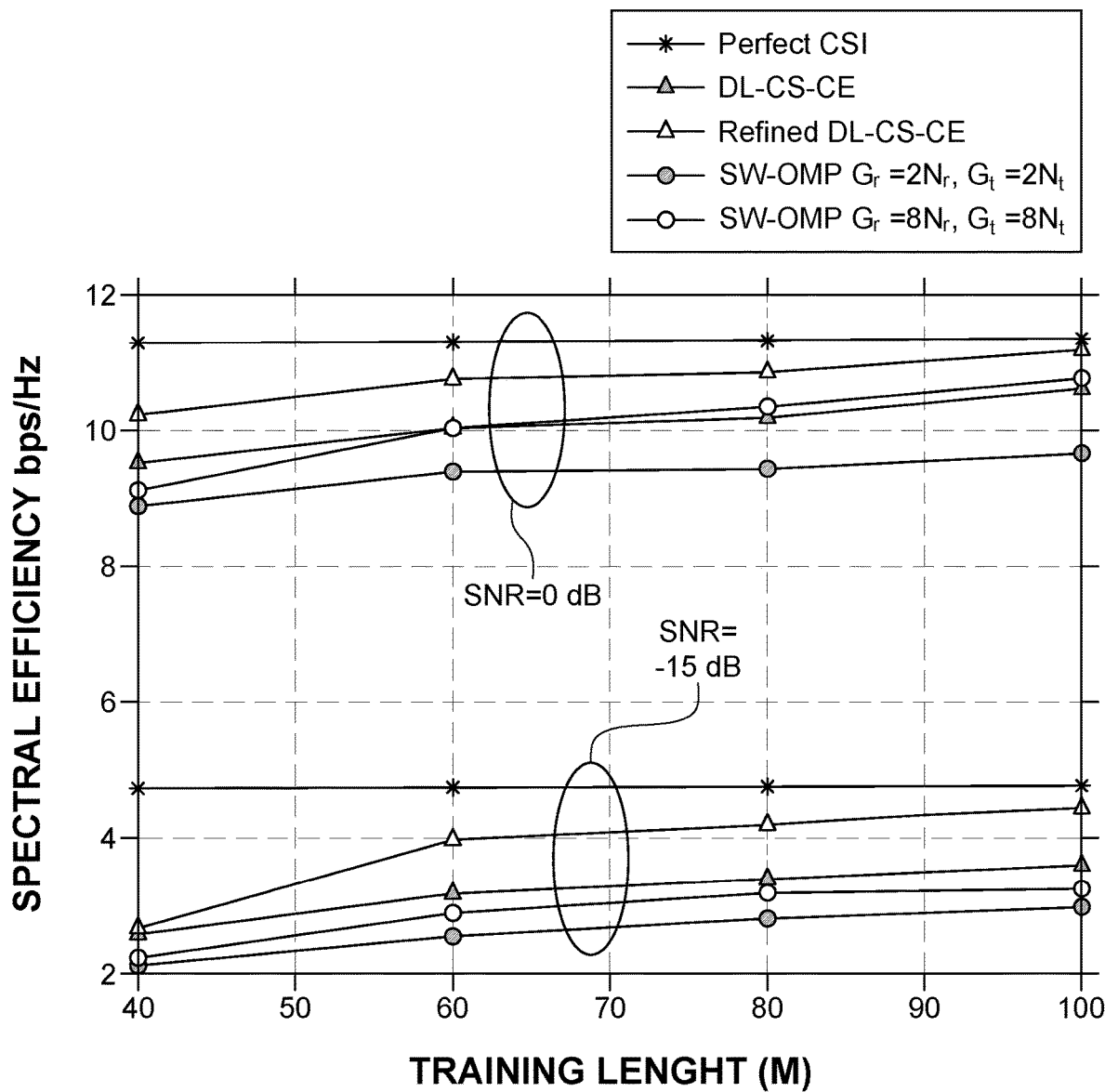
FIG. 15 shows the spectral efficiency vs. M training lengths for ($N_t$=16, $N_r$=64, K=16, SNR={−15.0 dB})

FIG. 15 shows the achievable spectral efficiency as a function of different training lengths for the proposed methods under different SNRs. It is noted that using M>40 frames does not significantly improve performance, which leverages the robustness of the two proposed methods. Simulations also show that near-optimal achievable rates can be achieved by using a reasonable number of frames, i.e., $60 \leq M \leq 100$. Therefore, with the proposed methods, it is possible to save in training overhead.

Finally, the inventors performed a time complexity analysis and the results, shown in Table IV in FIG. 16, indicate the online estimation stage computational times of the proposed methods and the SW-OMP. The SW-OMP is the slowest to solve the inherent optimization problem, especially for high-resolution dictionary matrices. The running time of the DL-CS-CE method without refining exhibits shorter computational times than the SW-OMP algorithm. However, for a fair comparison when the refined method is applied, the inventors have compared the running time of the refined DL-CS-CE method with higher resolution SW-OMP where $G_r = G_r^r = 8N_r$ and $G_t = G_t^r = 8N_t$, and the figure shows that the refined DL-CS-CE method takes less time to perform the channel estimation. Hence, it is concluded that the proposed DL-CS-CE methods are computationally efficient and tolerant, especially for higher resolution dictionary matrices.

Figure 17:
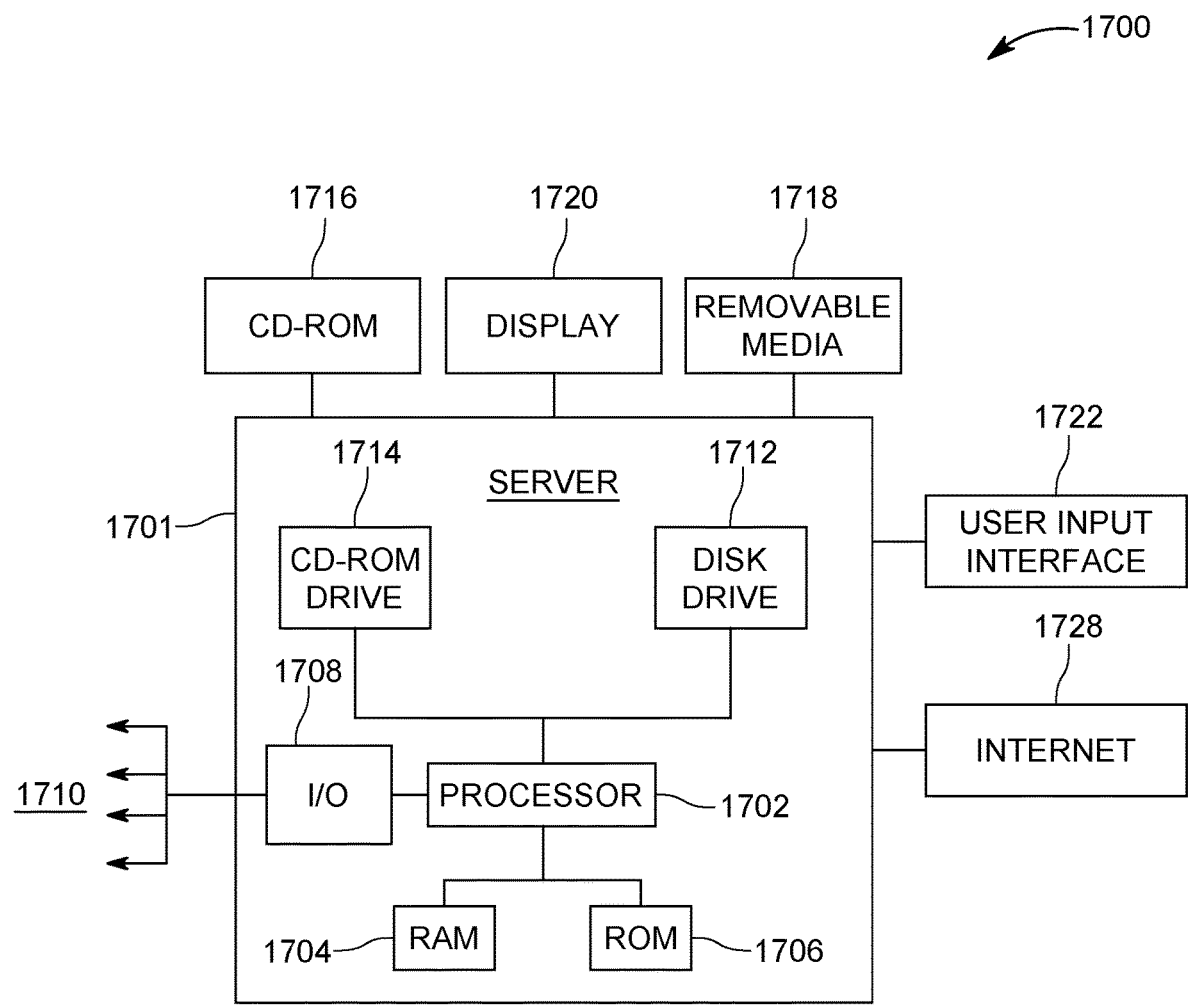
FIG. 17 is a schematic diagram of the circuitry that may be present in a receiver or transmitter.

The above-discussed procedures and methods may be implemented in a computing device as illustrated in FIG. 17. Hardware, firmware, software or a combination thereof may be used to perform the various steps and operations described herein. The computing device 1700 is suitable for performing the activities described in the above embodiments may include a server 1701. Such a server 1701 may include a central processor (CPU) 1702 coupled to a random access memory (RAM) 1704 and to a read-only memory (ROM) 1706. ROM 1706 may also be other types of storage media to store programs, such as programmable ROM (PROM), erasable PROM (EPROM), etc. Processor 1702 may communicate with other internal and external components through input/output (I/O) circuitry 1708 and bussing 1710 to provide control signals and the like. Processor 1702 carries out a variety of functions as are known in the art, as dictated by software and/or firmware instructions.

Server 1701 may also include one or more data storage devices, including hard drives 1712, CD-ROM drives 1714 and other hardware capable of reading and/or storing information, such as DVD, etc. In one embodiment, software for carrying out the above-discussed steps may be stored and distributed on a CD-ROM or DVD 1716, a USB storage device 1718 or other form of media capable of portably storing information. These storage media may be inserted into, and read by, devices such as CD-ROM drive 1714, disk drive 1712, etc. Server 1701 may be coupled to a display 1720, which may be any type of known display or presentation screen, such as LCD, plasma display, cathode ray tube (CRT), etc. A user input interface 1722 is provided, including one or more user interface mechanisms such as a mouse, keyboard, microphone, touchpad, touch screen, voice-recognition system, etc.

Server 1701 may be coupled to other devices, such as other smart devices, detectors, etc. The server may be part of a larger network configuration as in a global area network (GAN) such as the Internet 1728, which allows ultimate connection to various landline and/or mobile computing devices.

The disclosed embodiments provide two methods for deep learning based frequency-selective channel estimation for hybrid mmWave MIMO systems. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] H. Ye, G. Y. Li, and B. Juang, "Power of deep learning for channel estimation and signal detection in ofdm systems," IEEE Microw. Wireless Compon. Lett., vol. 7, no. 1, pp. 114-117, February 2018.

[2] P. Dong, H. Zhang, G. Y. Li, I. S. Gaspar, and N. Naderi Alizadeh, "Deep CNN-based channel estimation for mmwave massive MIMO systems," IEEE J. Sel. Topics Signal Process., vol. 13, no. 5, pp. 989-1000, September 2019.

[3] H. He, C. Wen, S. Jin, and G. Y. Li, "Deep learning-based channel estimation for beamspace mmwave massive MIMO systems," IEEE Commun. Lett., vol. 7, no. 5, pp. 852-855, October 2018.

[4] M. Soltani, V. Pourahmadi, A. Mirzaei, and H. Sheikhzadeh, "Deep learning-based channel estimation," IEEE Commun. Lett., vol. 23, no. 4, pp. 652-655, April 2019.

[5] W. Ma, C. Qi, Z. Zhang, and J. Cheng, "Sparse channel estimation and hybrid precoding using deep learning for millimeter wave massive MIMO," IEEE Trans. Commun., vol. 68, no. 5, pp. 2838-2849, May 2020.

[6] X. Wei, C. Hu, and L. Dai, "Knowledge-aided deep learning for beamspace channel estimation in millimeter-wave massive MIMO systems," arXiv preprint arXiv: 1910.12455, 2019.

[7] C. Chun, J. Kang, and I. Kim, "Deep learning-based channel estimation for massive MIMO systems," IEEE Microw. Wireless Compon. Lett., vol. 8, no. 4, pp. 1228-1231, August 2019.

[8] Y. Jin, J. Zhang, S. Jin, and B. Ai, "Channel estimation for cell-free mmwave massive MIMO through deep learning," IEEE Trans. Veh. Technol., vol. 68, no. 10, pp. 10325-10329, October 2019.

[9] E. Balevi, A. Doshi, and J. G. Andrews, "Massive mimo channel estimation with an untrained deep neural network," IEEE Trans. Wireless Commun., vol. 19, no. 3, pp. 2079-2090, March 2020.

[10] O. T. Demir and E. Björnson, "Channel estimation in massive mimo under hardware non-linearities: Bayesian methods versus deep learning," IEEE Open Journal of the Commun. Soc., vol. 1, pp. 109-124, 2020.

[11] Y. Long, Z. Chen, J. Fang, and C. Tellambura, "Data-driven-based analog beam selection for hybrid beamforming under mm-wave channels," IEEE J. Sel. Topics Signal Process., vol. 12, no. 2, pp. 340-352, May 2018.

[12] J. A. Hodge, K. Vijay Mishra, and A. I. Zaghloul, "Multi-discriminator distributed generative model for multi-layer rf metasurface discovery," in Proc. IEEE Global Conf. on Signal and Inform. Process. (GlobalSIP), Ottawa, ON, Canada, 2019, pp. 1-5.

[13] A. Alkhateeb, S. Alex, P. Varkey, Y. Li, Q. Qu, and D. Tujkovic, "Deep learning coordinated beamforming for highly-mobile millimeter wave systems," IEEE Access, vol. 6, pp. 37 328-37 348, 2018.

[14] H. Huang, Y. Song, J. Yang, G. Gui, and F. Adachi, "Deep-learningbased millimeter-wave massive MIMO for hybrid precoding," IEEE Trans. Veh. Technol., vol. 68, no. 3, pp. 3027-3032, March 2019.

[15] A. M. Elbir, "Cnn-based precoder and combiner design in mmwave MIMO systems," IEEE Commun. Lett., vol. 23, no. 7, pp. 1240-1243, July 2019.

[16] A. M. Elbir and K. V. Mishra, "Joint antenna selection and hybrid beamformer design using unquantized and quantized deep learning networks," IEEE Trans. Wireless Commun., vol. 19, no. 3, pp. 1677-1688, March 2020.

[17] A. M. Elbir and K. V. Mishra, "Online and offline deep learning strategies for channel estimation and hybrid beamforming in multi-carrier mm-wave massive MIMO systems," arXiv preprint arXiv:1912.10036, 2019.

[18] S. Dörner, S. Cammerer, J. Hoydis, and S. t. Brink, "Deep learning based communication over the air," IEEE J. Sel. Topics Signal Process., vol. 12, no. 1, pp. 132-143, February 2018.

[19] J. Rodriguez-Fernández, N. González-Prelcic, K. Venugopal, and R. W. Heath, "Frequency-domain compressive channel estimation for frequency-selective hybrid millimeter waveMIMO systems," IEEE Trans. Wireless Commun., vol. 17, no. 5, pp. 2946-2960, May 2018.

[20] K. Zhang, W. Zuo, Y. Chen, D. Meng, and L. Zhang, "Beyond a gaussian denoiser: Residual learning of deep cnn for image denoising," IEEE Trans. Image Process., vol. 26, no. 7, pp. 3142-3155, July 2017.

What is claimed is:

1. A machine learning based method for channel estimation for a multiple-input multiple-output (MIMO) system, the method comprising:
receiving a measured signal y[k] at a receiver of the MIMO system;
finding subcarriers k of the measured signal y[k];
estimating, with a convolutional neural network (CNN) channel amplitudes, channel amplitudes ĝ[k] of the measured signal y[k];
reconstructing a channel Ĥ[k][k], between the receiver and a transmitter of the MIMO system, based on the estimated channel amplitudes ĝ[k] and a low resolution whiten measurement matrix $\Upsilon_W$; and
adjusting a parameter of the MIMO system based on the reconstructed channel Ĥ[k][k],
wherein the channel amplitudes ĝ[k] are simultaneously estimated by the CNN.

2. The method of claim 1, wherein the receiver is a user terminal and the MIMO system is a hybrid mmWave MIMO system.

3. The method of claim 1, wherein the step of estimating comprises:
calculating a correlation vector c[k] based on a correlation of the measured signal y[k];
calculating a correlation matrix $C_\alpha$[k] based on the calculated correlation vector c[k];
estimating a channel amplitude matrix Ĝ[k] with the CNN, based on the calculated correlation matrix $C_\alpha$[k]; and
forming the channel amplitudes ĝ[k] by vectorizing the estimated channel amplitude matrix Ĝ[k].

4. The method of claim 1, wherein the step of reconstructing comprises:
iteratively selecting highest amplitudes from the estimated channel amplitudes ĝ[k] and calculating a residual r[k] as a difference between (1) a whiten form of the measured signal y[k], and (2) a projection of the measured signal y[k] along the low resolution whiten measurement matrix $\Upsilon_W$, until a predetermined threshold $\in$ is reached;
computing a sparse channel vector h$^v$[k] as the projection of the measured signal y[k]; and
calculating the reconstructed channel Ĥ[k][k] based on a vectorization of the sparse channel vector h$^v$[k], a dictionary matrix for a transmit array response of the transmitter, and a dictionary matrix for a receive array response of the receiver,
wherein a low resolution is about 4 times a number of receiver antennas times a number of transmitter antennas.

5. The method of claim 1, wherein the steps of finding, estimating, reconstructing and adjusting take place in a user terminal of the MIMO system.

6. The method of claim 1, wherein the steps of finding, estimating, reconstructing and adjusting take place in a base station of the MIMO system.

7. A transceiver performing a machine learning channel estimation for a multiple-input multiple-output (MIMO) system, the transceiver comprising:
an interface configured to receive a measured signal y[k] at a receiver of the MIMO system; and
a processor connected to the interface and configured to:
find subcarriers k of the measured signal y[k],
estimate, with a convolutional neural network (CNN) channel amplitudes, channel amplitudes ĝ[k] of the measured signal y[k],
reconstruct a channel Ĥ[k][k], between the receiver and a transmitter of the MIMO system, based on the estimated channel amplitudes ĝ[k] and a low resolution whiten measurement matrix $\Upsilon_W$, and
adjust a parameter of the MIMO system based on the reconstructed channel Ĥ[k][k],
wherein the channel amplitudes ĝ[k] are simultaneously estimated by the CNN.

8. The transceiver of claim 7, wherein the processor is further configured to:
calculate a correlation vector c[k] based on a correlation of the measured signal y[k];
calculate a correlation matrix $C_\alpha$[k] based on the calculated correlation vector c[k];
estimate a channel amplitude matrix Ĝ[k] with the CNN, based on the calculated correlation matrix $C_\alpha$[k]; and
form the channel amplitudes ĝ[k] by vectorizing the estimated channel amplitude matrix Ĝ[k].

9. The transceiver of claim 7, wherein the processor is further configured to:
iteratively select highest amplitudes from the estimated channel amplitudes ĝ[k] and calculate a residual r[k] as a difference between (1) a whiten form of the measured signal y[k], and (2) a projection of the measured signal y[k] along the low resolution whiten measurement matrix $\Upsilon_W$, until a predetermined threshold E is reached;

compute a sparse channel vector h$^v$[k] as the projection of the measured signal y[k]; and calculate the reconstructed channel Ĥ[k][k] based on a vectorization of the sparse channel vector h$^v$[k], a dictionary matrix for a transmit array response of the transmitter, and a dictionary matrix for a receive array response of the receiver, wherein a low resolution is about 4 times a number of receiver antennas times a number of transmitter antennas.

10. The transceiver of claim 7, further comprising:

a first plurality of antennas configured to receive the measured signal y[k]; and a second plurality of antennas configured to transmit a different signal.

11. A refined machine learning based method for channel estimation for a multiple-input multiple-output (MIMO) system, the method comprising:

receiving a measured signal y[k] at a receiver of the MIMO system;

finding subcarriers k of the measured signal y[k];

estimating, with a convolutional neural network (CNN) channel amplitudes ĝ[k] of the measured signal y[k];

reconstructing and refining a channel Ĥ[k][k] between the receiver and a transmitter of the MIMO system based on the estimated channel amplitudes ĝ[k] and a high resolution whiten measurement matrix $\Upsilon_w^r$; and adjusting a parameter of the MIMO system based on the reconstructed channel Ĥ[k][k], wherein the channel amplitudes ĝ[k] are simultaneously estimated by the CNN.

12. The method of claim 11, wherein the receiver is a user terminal and the MIMO system is a hybrid mmWave MIMO system.

13. The method of claim 11, wherein the step of estimating comprises:

calculating a correlation vector c[k] based on a correlation of the measured signal y[k];

calculating a correlation matrix C$_\alpha$[k] based on the calculated correlation vector c[k];

estimating a channel amplitude matrix Ĝ[k] with the CNN based on the calculated correlation matrix C$_\alpha$[k]; and forming the channel amplitudes ĝ[k] by vectorizing the estimated channel amplitude matrix Ĝ[k].

14. The method of claim 11, wherein the step of reconstructing comprises:

iteratively selecting highest amplitudes from the estimated channel amplitudes ĝ[k] and calculating a residual r[k] as a difference between (1) a whiten form of the measured signal y[k], and (2) a projection of the measured signal y[k] along the high resolution whiten measurement matrix $\Upsilon_w^r$, until a predetermined threshold E is reached;

computing a sparse channel vector h$^v$[k] as the projection of the measured signal y[k]; and calculating the reconstructed channel Ĥ[k][k] based on a vectorization of the sparse channel vector h$^v$[k], a dictionary matrix for a transmit array response of the transmitter, and a dictionary matrix for a receive array response of the receiver, wherein a high resolution is equal to or larger than 64 times a number of receiver antennas times a number of transmitter antennas.

15. The method of claim 11, wherein the steps of finding, estimating, reconstructing and adjusting take place in a user terminal of the MIMO system.

16. The method of claim 11, wherein the steps of finding, estimating, reconstructing and adjusting take place in a base station of the MIMO system.

17. A transceiver performing a machine learning channel estimation for a multiple-input multiple-output (MIMO) system, the transceiver comprising:

an interface configured to receive a measured signal y[k] at a receiver of the MIMO system; and a processor connected to the interface and configured to, find subcarriers k of the measured signal y[k], estimate, with a convolutional neural network (CNN) channel amplitudes ĝ[k] of the measured signal y[k], reconstruct and refine a channel Ĥ[k][k] between the receiver and a transmitter of the MIMO system based on the estimated channel amplitudes ĝ[k] and a high resolution whiten measurement matrix $\Upsilon_w^r$, and adjust a parameter of the MIMO system based on the reconstructed channel Ĥ[k], wherein the channel amplitudes ĝ[k] are simultaneously estimated by the CNN.

18. The transceiver of claim 17, wherein the processor is further configured to:

calculate a correlation vector c[k] based on a correlation of the measured signal y[k];

calculate a correlation matrix C$_\alpha$[k] based on the calculated correlation vector c[k];

estimate a channel amplitude matrix G[k] with the CNN based on the calculated correlation matrix C$_\alpha$[k]; and form the channel amplitudes ĝ[k] by vectorizing the estimated channel amplitude matrix Ĝ[k].

19. The transceiver of claim 17, wherein the processor is further configured to:

iteratively select highest amplitudes from the estimated channel amplitudes ĝ[k] and calculate a residual r[k] as a difference between (1) a whiten form of the measured signal y[k], and (2) a projection of the measured signal y[k] along the high resolution whiten measurement matrix $\Upsilon_w^r$, until a predetermined threshold E is reached;

compute a sparse channel vector h$^v$[k] as the projection of the measured signal y[k]; and calculate the reconstructed channel Ĥ[k][k] based on a vectorization of the computed sparse channel vector h$^v$[k], a dictionary matrix for a transmit array response of the transmitter, and a dictionary matrix for a receive array response of the receiver, wherein a high resolution is equal to or larger than 64 times a number of receiver antennas times a number of transmitter antennas.

20. The transceiver of claim 17, further comprising:

a first plurality of antennas configured to receive the measured signal y[k]; and a second plurality of antennas configured to transmit a different signal.

* * * * *